(12) United States Patent
Hsu et al.

(10) Patent No.: US 8,743,483 B2
(45) Date of Patent: Jun. 3, 2014

(54) IMAGING LENS ASSEMBLY

(71) Applicant: Largan Precision Co., Ltd., Taichung (TW)

(72) Inventors: Po-Lun Hsu, Taichung (TW); Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 29 days.

(21) Appl. No.: 13/733,876

(22) Filed: Jan. 3, 2013

(65) Prior Publication Data

US 2014/0092491 A1    Apr. 3, 2014

(30) Foreign Application Priority Data

Oct. 2, 2012    (TW) .............................. 101136381 A

(51) Int. Cl.

| | |
|---|---|
| *G02B 9/62* | (2006.01) |
| *G02B 9/00* | (2006.01) |
| *G02B 9/60* | (2006.01) |
| *G02B 9/64* | (2006.01) |
| *G02B 13/00* | (2006.01) |
| *G02B 13/02* | (2006.01) |
| *G02B 13/18* | (2006.01) |

(52) U.S. Cl.
CPC ... *G02B 9/62* (2013.01); *G02B 9/00* (2013.01); *G02B 9/60* (2013.01); *G02B 9/64* (2013.01); *G02B 13/00* (2013.01); *G02B 13/02* (2013.01); *G02B 13/001* (2013.01); *G02B 13/18* (2013.01); *G02B 13/0045* (2013.01)
USPC .............................. 359/761; 359/756; 359/754

(58) Field of Classification Search
CPC .............. G02B 9/00; G02B 9/60; G02B 9/62; G02B 9/64; G02B 13/00; G02B 13/02; G02B 13/001; G02B 13/18; G02B 13/0045
USPC ......... 359/713, 714, 746, 764, 770, 755, 756, 359/761, 754
See application file for complete search history.

(56) References Cited

U.S. PATENT DOCUMENTS

| 8,643,957 | B2 * | 2/2014 | Chen et al. ..................... 359/713 |
| 2012/0243108 | A1 * | 9/2012 | Tsai et al. ..................... 359/713 |
| 2013/0021680 | A1 * | 1/2013 | Chen et al. ..................... 359/714 |
| 2013/0070346 | A1 * | 3/2013 | Hsu et al. ..................... 359/713 |

* cited by examiner

*Primary Examiner* — Ricky Mack
*Assistant Examiner* — William Alexander
(74) *Attorney, Agent, or Firm* — CKC & Partners Co., Ltd.

(57) ABSTRACT

An imaging lens assembly includes, in order from an object side to an image side, a first lens element, a second lens element, a third lens element, a fourth lens element, a fifth lens element and a sixth lens element. The first lens element with negative refractive power has a convex object-side surface and a concave image-side surface. The second lens element has positive refractive power. The third lens element has refractive power. The fourth lens element with refractive power has an object-side surface and an image-side surface being aspheric. The fifth lens element with positive refractive power has an object-side surface and an image-side surface being aspheric. The sixth lens element with negative refractive power has a concave image-side surface, wherein at least one reflection point is formed on the image-side surface thereof.

22 Claims, 19 Drawing Sheets

IMAGING LENS ASSEMBLY

RELATED APPLICATIONS

The application claims priority to Taiwan Application Serial Number 101136381, filed on Oct. 2, 2012, which is herein incorporated by reference.

BACKGROUND

1. Technical Field

The present disclosure relates to an imaging lens assembly. More particularly, the present disclosure relates to a compact imaging lens assembly applicable to electronic products.

2. Description of Related Art

In recent years, with the popularity of mobile products with camera functionalities, the demand for miniaturizing an optical lens assembly is increasing. The sensor of a conventional photographing camera is typically a CCD (Charge-Coupled Device) image sensor or a CMOS (Complementary Metal-Oxide-Semiconductor) sensor. As advanced semiconductor manufacturing technologies have allowed the pixel size of sensors to be reduced and compact optical lens assemblies have gradually evolved toward the field of higher megapixels, there is an increasing demand for optical lens assemblies featuring better image quality.

A conventional compact optical lens assembly employed in a mobile device mainly adopts a five-element lens structure such as the one disclosed in U.S. Pat. No. 8,000,031. Due to the popularity of mobile products with high-end specifications, such as smartphones and PDAs (Personal Digital Assistants), the pixel and image-quality requirements of the compact optical lens assembly have increased rapidly. However, the conventional five-element lens structure cannot satisfy the requirements of the compact optical lens assembly with high-end specifications.

Although another conventional optical lens assembly with six-element lens structure such as the one disclosed in U.S. 2012/0170142 is provided. However, the arrangement of positive refractive power near the object-side of the optical lens assembly is insufficient. Therefore, the back focal length can't be effectively miniaturized for reducing the total track length of the optical lens assembly with a large field of view, so it is unable to maintain the compact size thereof, as well as to reduce the aberration and the distortion by the first two lens elements of the optical lens assembly.

SUMMARY

According to one aspect of the present disclosure, an imaging lens assembly includes, in order from an object side to an image side, a first lens element, a second lens element, a third lens element, a fourth lens element, a fifth lens element, and a sixth lens element. The first lens element with negative refractive power has a convex object-side surface and a concave image-side surface. The second lens element has positive refractive power. The third lens element has refractive power. The fourth lens element has refractive power, wherein an object-side surface and an image-side surface of the fourth lens element are aspheric. The fifth lens element has positive refractive power, wherein an object-side surface and an image-side surface of the fifth lens element are aspheric. The sixth lens element with negative refractive power has a concave image-side surface, wherein the sixth lens element has at least one inflection point on the image-side surface thereof. Wherein, a curvature radius of an object-side surface of the sixth lens element is R11, a curvature radius of the image-side surface of the sixth lens element is R12, a focal length of the imaging lens assembly is f, a focal length of the sixth lens element is f6, and the following relationships are satisfied: $0 < |R12/R11| < 1.0$; and $-2.5 < f/f6 < -0.60$.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
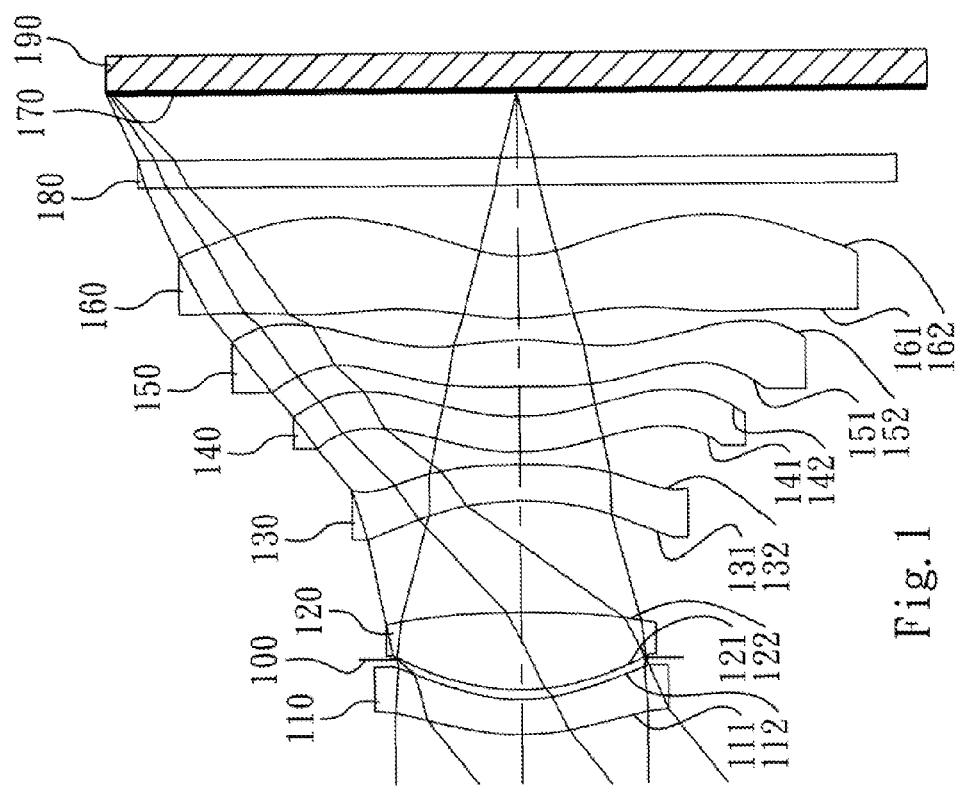
FIG. 1 is a schematic view of an imaging lens assembly according to the 1st embodiment of the present disclosure.

An imaging lens assembly includes, in order from an object side to an image side, a first lens element, a second lens element, a third lens element, a fourth lens element, a fifth lens element, and a sixth lens element. The imaging lens assembly further includes an image sensor located on an image plane.

The first lens element with negative refractive power has a convex object-side surface and a concave image-side surface. Therefore, the field of view of the imaging lens assembly can be enlarged for increasing the image capturing range.

The second lens element with positive refractive power can have a convex object-side surface. Therefore, the spherical aberration of the imaging lens assembly can be moderated.

The third lens element can have a concave object-side surface and a convex image-side surface, so that the astigmatism of the imaging lens assembly can be corrected.

The fourth lens element can have a convex object-side surface and a concave image-side surface, so that the astigmatism of the imaging lens assembly can be corrected. The object-side surface of the fourth lens element changes from convex at a paraxial region to concave at a peripheral region, the image-side surface of the fourth lens element changes from concave at a paraxial region to convex at a peripheral region, and the fourth lens element has at least one inflection point on the object-side surface and the image-side surface thereof. Therefore, the incident angle of light of the off-axis field can be properly adjusted, and the aberration of the off-axis field can be corrected.

The fifth lens element has positive refractive power, so that the high order aberration of the imaging lens assembly can be corrected. An image-side surface of the fifth lens element changes from convex to concave, then from concave to convex from a paraxial region to a peripheral region thereof, and the fifth lens element has at least one inflection point on an object-side surface and the image-side surface thereof, so that the incident angle of light of the off-axis field can be adjusted and the aberration of the off-axis field can be corrected.

The sixth lens element with negative refractive power can have a convex object-side surface and a concave image-side surface. Therefore, a principal point of the imaging lens assembly can be positioned away from the image plane, and the total track length of the imaging lens assembly can be reduced so as to maintain the compact size thereof. Moreover, the sixth lens element has at least one inflection point on the image-side surface thereof, so that the incident angle of light of the off-axis field on the image sensor can be effectively minimized and the aberration thereof can be corrected as well.

When a curvature radius of the object-side surface of the sixth lens element is R11, and a curvature radius of the image-side surface of the sixth lens element is R12, the following relationship is satisfied: $0<|R12/R11|<1.0$. Therefore, the astigmatism can be effectively corrected, and the principal point of the imaging lens assembly can be positioned away from the image plane, thus the total track length of the imaging lens assembly can be reduced so as to maintain the compact size thereof. Preferably, R11 and R12 can satisfy the following relationship: $0<|R12/R11|<0.60$.

When a focal length of the imaging lens assembly is f, and a focal length of the sixth lens element is f6, the following relationship is satisfied: $-2.5<f/f6<-0.60$. Therefore, the back focal length of the imaging lens assembly can be minimized for maintaining the compact size thereof. Preferably, f and f6 can satisfy the following relationship: $-2.0<f/f6<-0.80$.

When a composite focal length of the first lens element and the second lens element is f12, and a focal length of the second lens element is f2, the following relationship is satisfied: $0.9<f12/f2<1.8$. Therefore, the proper distribution of refractive power of the second lens element of the first two lens elements is favorable for shortening the total track length while increasing the image capturing range and reducing the spherical aberration.

When an f-number of the imaging lens assembly is Fno, the following relationship is satisfied: $1.5<Fno<2.5$. Therefore, sufficient light entry of the imaging lens assembly can be obtained by properly utilizing the larger aperture. Furthermore, a clear image can be obtained by applying a high speed shutter due to the large aperture of the imaging lens assembly.

When a maximum image height of the imaging lens assembly is ImgH, and the focal length of the imaging lens assembly is f, the following relationship is satisfied: $0.70<ImgH/f<1.10$. Therefore, the compact size of the imaging lens assembly can be maintained for being applicable on mobile devices.

When the maximum image height of the imaging lens assembly is ImgH, and an axial distance between the image-side surface of the sixth lens element and the image plane is BL, the following relationship is satisfied: $0.15<BL/ImgH<0.50$. Therefore, the back focal length of the imaging lens assembly can be minimized for maintaining the compact size thereof.

When a curvature radius of the object-side surface of the fifth lens element is R9, and a curvature radius of the image-side surface of the fifth lens element is R10, the following relationship is satisfied: $-0.5<(R9+R10)/(R9-R10)<2.5$. Therefore, it is favorable for correcting the spherical aberration and astigmatism of the imaging lens assembly by properly adjusting the curvature radius of the fifth lens element.

When an Abbe number of the second lens element is V2, and an Abbe number of the third lens element is V3, the following relationship is satisfied: $0.2<V3/V2<0.5$. Therefore, the chromatic aberration of the imaging lens assembly can be corrected.

When a curvature radius of the object-side surface of the second lens element is R3, and a curvature radius of an image-side surface of the second lens element is R4, the following relationship is satisfied: $-1.2<(R3+R4)/(R3-R4)<-0.45$. Therefore, it is favorable for moderating the spherical aberration of the imaging lens assembly by properly adjusting the curvature radius of the second lens element.

When a minimum distance between an optical axis and a non-axial critical point on the image-side surface of the sixth lens element is Yc62, and the focal length of the imaging lens assembly is f, the following relationship is satisfied: $0.1<Yc62/f<0.8$. Therefore, the incident angle of light of the off-axis field on the image sensor can be effectively minimized and the aberration thereof can be corrected as well.

When a focal length of the first lens element is f1, and the focal length of the second lens element is f2, the following relationship is satisfied: $-0.5<f2/f1<0$. Therefore, it is favorable for obtaining the proper total track length of the imaging lens assembly, and the spherical aberration can be moderated as well.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and an axial distance between the fifth lens element and the sixth lens element is T56, and T23 is the largest among T12, T23, T34, T45, and T56. Therefore, it is favorable for assembling the lens elements to enhance the manufacturing yield rate by properly adjusting the distance between each lens element.

When the maximum image height of the imaging lens assembly is ImgH, and an axial distance between the object-side surface of the first lens element and the image plane is TTL, the following relationship is satisfied: $TTL/ImgH<1.7$.

Therefore, the compact size of the imaging lens assembly can be maintained for being applied on electronic devices.

When a central thickness of the third lens element is CT3, a central thickness of the fourth lens element is CT4, a central thickness of the fifth lens element is CT5, and the focal length of the imaging lens assembly is f, the following relationship is satisfied: 0.20<(CT3+CT4+CT5)/f<0.40. Therefore, it is favorable for manufacturing the lens element by properly adjusting the thickness thereof.

When a curvature radius of the object-side surface of the first lens element is R1, and a curvature radius of the image-side surface of the first lens element is R2, the following relationship is satisfied: 0.03<(R1−R2)/(R1+R2)<0.3. Therefore, the field of view of the imaging lens assembly can be enlarged.

According to the imaging lens assembly of the present disclosure, the lens elements thereof can be made of plastic material or glass. When the lens elements are made of glass material, the allocation of the refractive power of the imaging lens assembly may be more flexible and easier to design. When the lens elements are made of plastic material, the cost of manufacture can be effectively reduced. Furthermore, the surface of each lens element can be aspheric, so that it is easier to make the surface into non-spherical shapes. As a result, more controllable variables are obtained, and the aberration is reduced, and the number of required lens elements can be reduced while constructing an optical system. Therefore, the total track length of the imaging lens assembly can also be reduced.

According to the imaging lens assembly of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the surface is convex at the paraxial region; and when the lens element has a concave surface, it indicates that the surface is concave at the paraxial region.

According to the imaging lens assembly of the present disclosure, there can be at least one stop provided, such as an aperture stop, a glare stop, or a field stop. Said glare stop or said field stop is allocated for reducing the stray light and thereby improving the image resolution thereof. Furthermore, an aperture stop can be configured as a front stop or a middle stop. A front stop can provide a longer distance from an exit pupil of the imaging lens assembly to an image plane and thereby the generated telecentric effect improves the image-sensing efficiency of an image sensor. A middle stop is favorable for enlarging the field of view of the imaging lens assembly and thereby provides a wider field of view for the same.

The imaging lens assembly of the present disclosure has advantages on superb aberration correction and excellent image quality. Therefore, the imaging lens assembly can be applicable on the electronic imaging systems such as 3D (three dimensional) capturing systems, digital cameras, portable devices, and tablet computers, etc.

According to the above description of the present disclosure, the following 1st-9th specific embodiments are provided for further explanation.

1st Embodiment

FIG. 1 is a schematic view of an imaging lens assembly according to the 1st embodiment of the present disclosure.

Figure 2:
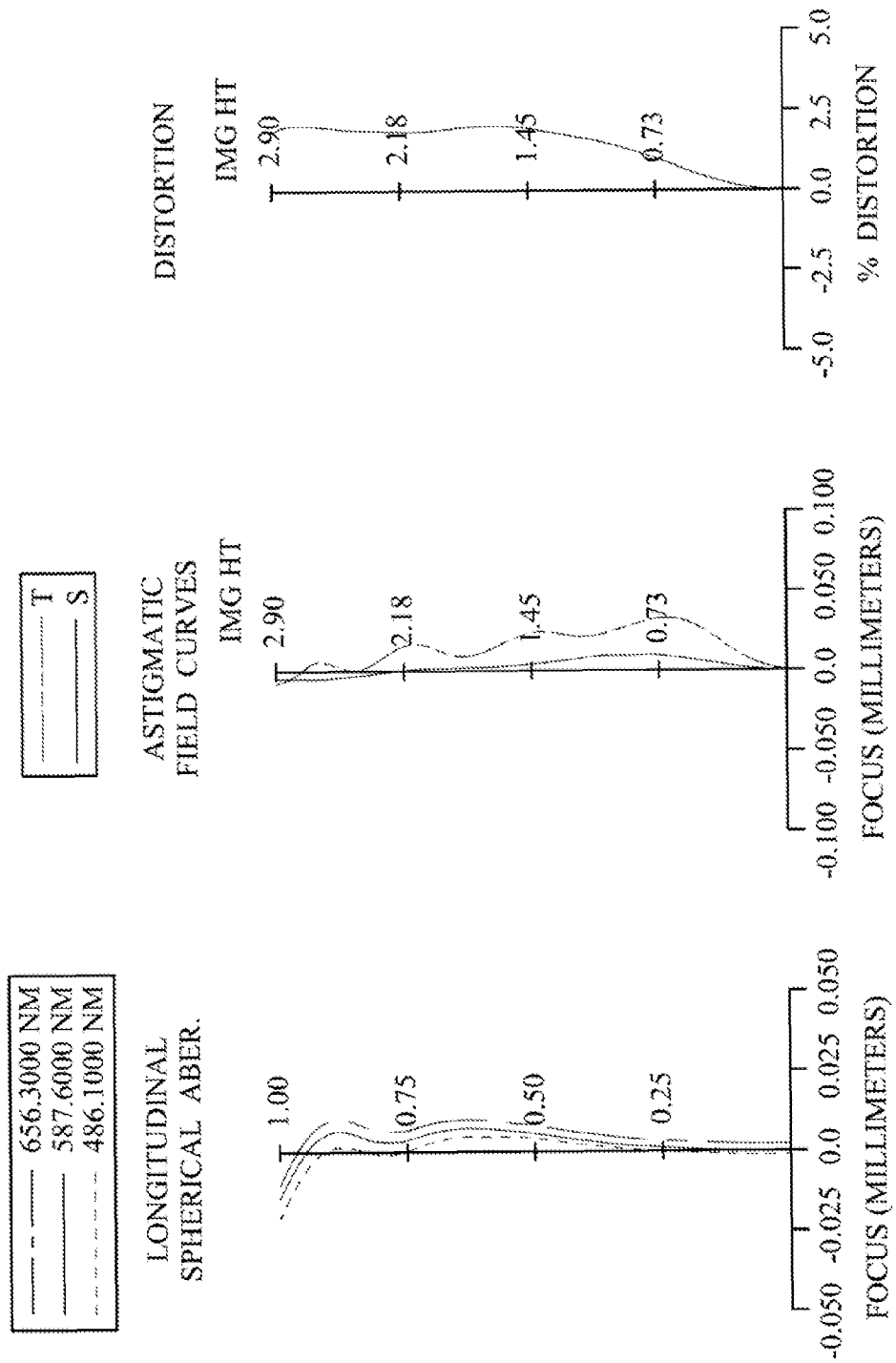
FIG. 2 shows spherical aberration curves, astigmatic field curves and a distortion curve of the imaging lens assembly according to the 1st embodiment.

FIG. 2 shows spherical aberration curves, astigmatic field curves and a distortion curve of the imaging lens assembly according to the 1st embodiment. In FIG. 1, the imaging lens assembly includes, in order from an object side to an image side, a first lens element 110, an aperture stop 100, a second lens element 120, a third lens element 130, a fourth lens element 140, a fifth lens element 150, a sixth lens element 160, an IR-cut filter 180, an image plane 170 and an image sensor 190.

The first lens element 110 with negative refractive power has a convex object-side surface 111 and a concave image-side surface 112. The first lens element 110 is made of plastic material and has the object-side surface 111 and the image-side surface 112 being aspheric.

The second lens element 120 with positive refractive power has a convex object-side surface 121 and a convex image-side surface 122. The second lens element 120 is made of plastic material and has the object-side surface 121 and the image-side surface 122 being aspheric. An axial distance between the second lens element 120 and the third lens element 130 is T23, and T23 is the largest among all the axial distances of the lens elements with refractive power.

The third lens element 130 with negative refractive power has a concave object-side surface 131 and a convex image-side surface 132. The third lens element 130 is made of plastic material and has the object-side surface 131 and the image-side surface 132 being aspheric.

The fourth lens element 140 with positive refractive power has a convex object-side surface 141 and a concave image-side surface 142, wherein the object-side surface 141 changes from convex at a paraxial region to concave at a peripheral region, and the image-side surface 142 changes from concave at a paraxial region to convex at a peripheral region, and at least one inflection point is formed on the object-side surface 141 and the image-side surface 142 thereof. The fourth lens element 140 is made of plastic material and has the object-side surface 141 and the image-side surface 142 being aspheric.

The fifth lens element 150 with positive refractive power has a concave object-side surface 151 and a convex image-side surface 152, wherein the image-side surface 152 changes from convex to concave, then from concave to convex from a paraxial region to a peripheral region, and at least one inflection point is formed on the object-side surface 151 and the image-side surface 152 thereof. The fifth lens element 150 is made of plastic material and has the object-side surface 151 and the image-side surface 152 being aspheric.

The sixth lens element 160 with negative refractive power has a convex object-side surface 161 and a concave image-side surface 162, wherein at least one inflection point is formed on the object-side surface 161 and the image-side surface 162 thereof. The sixth lens element 160 is made of plastic material and has the object-side surface 161 and the image-side surface 162 being aspheric.

The IR-cut filter 180 made of glass material is located between the sixth lens element 160 and the image plane 170, and will not affect the focal length of the imaging lens assembly.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i)$$

where:

X is the relative distance of a point on the aspheric surface spaced at a distance Y from the optical axis relative to the tangential plane at the aspheric surface vertex on the optical axis;

Y is the distance from the point on the curve of the aspheric surface to the optical axis;

R is the curvature radius of the lens elements;

k is the conic coefficient; and

Ai is the i-th aspheric coefficient.

In the imaging lens assembly according to the 1st embodiment, when a focal length of the imaging lens assembly is f, an f-number of the imaging lens assembly is Fno, and a half of a maximal field of view is HFOV, these parameters have the following values:

f=3.59 mm;

Fno=2.00; and

HFOV=38.4 degrees.

In the imaging lens assembly according to the 1st embodiment, when an Abbe number of the second lens element 120 is V2, and an Abbe number of the third lens element 130 is V3, the following relationship is satisfied: V3/V2=0.42.

In the imaging lens assembly according to the 1st embodiment, when the focal length of the imaging lens assembly is f, a central thickness of the third lens element 130 is CT3, a central thickness of the fourth lens element 140 is CT4, and a central thickness of the fifth lens element 150 is CT5, the following relationship is satisfied: (CT3+CT4+CT5)/f=0.23.

In the imaging lens assembly according to the 1st embodiment, when a curvature radius of the object-side surface 111 of the first lens element 110 is R1, a curvature radius of the image-side surface 112 of the first lens element 110 is R2, a curvature radius of the object-side surface 121 of the second lens element 120 is R3, a curvature radius of the image-side surface 122 of the second lens element 120 is R4, a curvature radius of the object-side surface 151 of the fifth lens element 150 is R9, a curvature radius of the image-side surface 152 of the fifth lens element 150 is R10, a curvature radius of the object-side surface 161 of the sixth lens element 160 is R11, and a curvature radius of the image-side surface 162 of the sixth lens element 160 is R12, the following relationships are satisfied: (R1−R2)/(R1+R2)=0.17; (R3+R4)/(R3−R4)=−0.69; (R9+R10)/(R9−R10)=1.08; and |R12/R11|=0.45.

In the imaging lens assembly according to the 1st embodiment, when the focal length of the imaging lens assembly is f, a focal length of the first lens element is f1, a focal length of the second lens element 120 is f2, a composite focal length of the first lens element 110 and the second lens element 120 is f12, and a focal length of the sixth lens element 160 is f6, the following relationships are satisfied: f2/f1=−0.30; f12/f2=1.52; and f/f6=−1.01.

Figure 19:
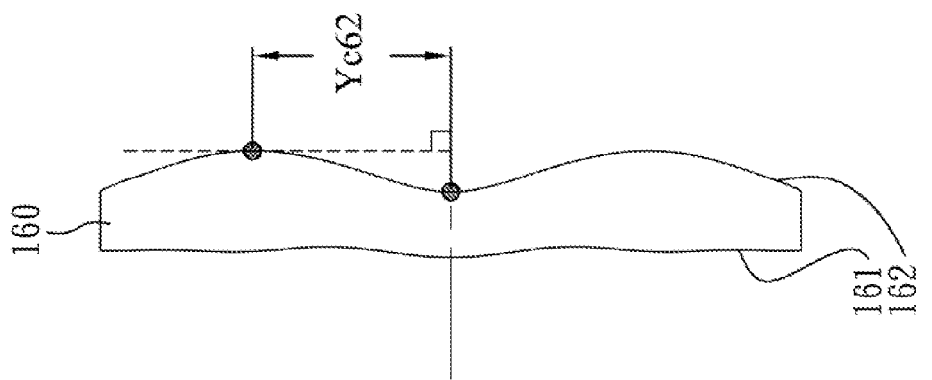
FIG. 19 is a schematic view of Yc62 according to the 1st embodiment of the present disclosure.

FIG. 19 is a schematic view of Yc62 according to the 1st embodiment of the present disclosure. In FIG. 19, when a minimum distance between an optical axis and a non-axial critical point on the image-side surface 162 of the sixth lens element 160 is Yc62, and the focal length of the imaging lens assembly is f, the following relationship is satisfied: Yc62/f=0.38.

In the imaging lens assembly according to the 1st embodiment, when a maximum image height of the imaging lens assembly is ImgH which here is a half of the diagonal length of the photosensitive area of the image sensor 190 on the image plane 170, the focal length of the imaging lens assembly is f, an axial distance between the image-side surface 162 of the sixth lens element 160 and the image plane 170 is BL, and an axial distance between the object-side surface 111 of the first lens element 110 and an image plane 170 is TTL, the following relationships are satisfied: ImgH/f=0.81; BL/ImgH=0.41; and TTL/ImgH=1.56.

The detailed optical data of the 1st embodiment are shown in Table 1 and the aspheric surface data are shown in Table 2 below.

TABLE 1

1st Embodiment
f = 3.59 mm, Fno = 2.00, HFOV = 38.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.746 | ASP | 0.250 | Plastic | 1.640 | 23.3 | −8.40 |
| 2 | | 1.244 | ASP | 0.288 | | | | |
| 3 | Ape. Stop | Plano | | −0.218 | | | | |
| 4 | Lens 2 | 1.589 | ASP | 0.549 | Plastic | 1.544 | 55.9 | 2.52 |
| 5 | | −8.745 | ASP | 0.794 | | | | |
| 6 | Lens 3 | −2.326 | ASP | 0.260 | Plastic | 1.640 | 23.3 | −6.92 |
| 7 | | −5.117 | ASP | 0.090 | | | | |
| 8 | Lens 4 | 1.590 | ASP | 0.250 | Plastic | 1.544 | 55.9 | 16.49 |
| 9 | | 1.826 | ASP | 0.214 | | | | |
| 10 | Lens 5 | −47.176 | ASP | 0.332 | Plastic | 1.544 | 55.9 | 3.61 |
| 11 | | −1.890 | ASP | 0.151 | | | | |
| 12 | Lens 6 | 1.958 | ASP | 0.448 | Plastic | 1.535 | 56.3 | −3.56 |
| 13 | | 0.888 | ASP | 0.500 | | | | |
| 14 | IR-cut filter | Plano | | 0.200 | Glass | 1.517 | 64.2 | — |
| 15 | | Plano | | 0.480 | | | | |
| 16 | Image Plane | Plano | | — | | | | |

Reference wavelength (d-line) is 587.6 nm

TABLE 2

Aspheric Coefficients

| Surface # | 1 | 2 | 4 | 5 |
|---|---|---|---|---|
| k = | −3.1131E+00 | −7.9205E−01 | −1.5506E+00 | 1.8589E+00 |
| A4 = | −5.9422E−02 | −1.6597E−01 | −1.9132E−02 | −4.3281E−02 |
| A6 = | −2.2999E−02 | −2.3166E−03 | −1.3944E−03 | 2.9578E−02 |
| A8 = | 4.2931E−02 | 9.5336E−02 | 3.2381E−03 | −7.9760E−02 |
| A10 = | −9.1040E−02 | −2.3585E−01 | 2.8567E−02 | 1.1884E−01 |
| A12 = | 7.9903E−02 | 2.7291E−01 | −1.9231E−02 | −5.6474E−02 |
| A14 = | −2.5209E−02 | −1.1856E−01 | | |

| Surface # | 6 | 7 | 8 | 9 |
|---|---|---|---|---|
| k = | 3.1166E+00 | −1.1417E+01 | −1.8258E+00 | −7.5003E+00 |
| A4 = | −1.3482E−02 | −1.0575E−01 | −4.9072E−02 | 1.7744E−01 |
| A6 = | −1.7270E−02 | −1.6497E−01 | −1.6766E−01 | −3.5637E−01 |
| A8 = | −1.6870E−01 | 2.5136E−01 | 1.2466E−01 | 1.8421E−01 |
| A10 = | 6.3652E−01 | −6.9540E−02 | −1.6547E−02 | 4.0720E−03 |
| A12 = | −5.3656E−01 | 1.2719E−02 | −1.7143E−02 | −4.0545E−02 |
| A14 = | 1.5072E−01 | −7.9551E−03 | 5.2510E−03 | 1.4387E−02 |
| A16 = | | | | −1.5688E−03 |

| Surface # | 10 | 11 | 12 | 13 |
|---|---|---|---|---|
| k = | −1.9909E+01 | −4.5508E+00 | −8.2995E+00 | −4.2575E+00 |
| A4 = | 3.6564E−01 | 4.2766E−01 | −1.8338E−01 | −1.6040E−01 |
| A6 = | −3.4277E−01 | −2.7471E−01 | 5.5724E−02 | 9.5058E−02 |
| A8 = | 1.3101E−01 | 7.9331E−02 | 1.8810E−02 | −4.0427E−02 |
| A10 = | −1.4462E−02 | −8.1307E−03 | −1.4738E−02 | 1.1003E−02 |
| A12 = | −7.4273E−03 | −1.0793E−03 | 3.4387E−03 | −1.8354E−03 |
| A14 = | 2.8249E−03 | 3.0689E−04 | −3.5220E−04 | 1.7417E−04 |
| A16 = | −2.8573E−04 | −1.7869E−05 | 1.3172E−05 | −7.2540E−06 |

In Table 1, the curvature radius, the thickness and focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
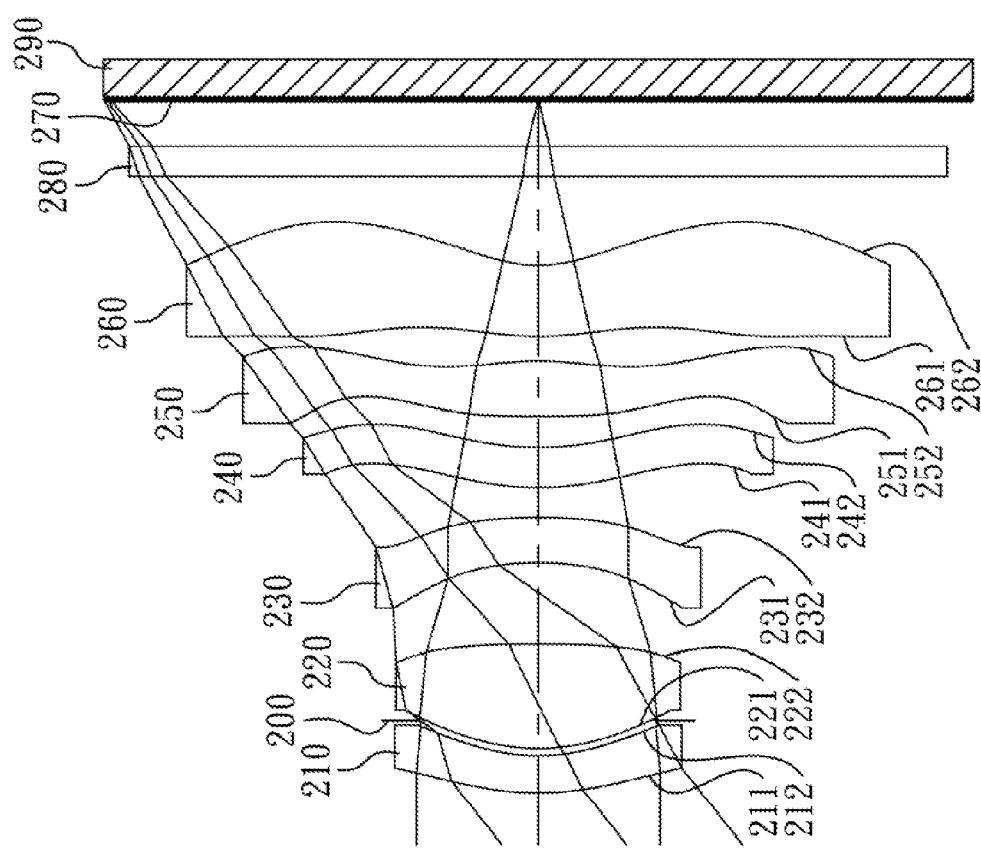
FIG. 3 is a schematic view of an imaging lens assembly according to the 2nd embodiment of the present disclosure.
Figure 4:
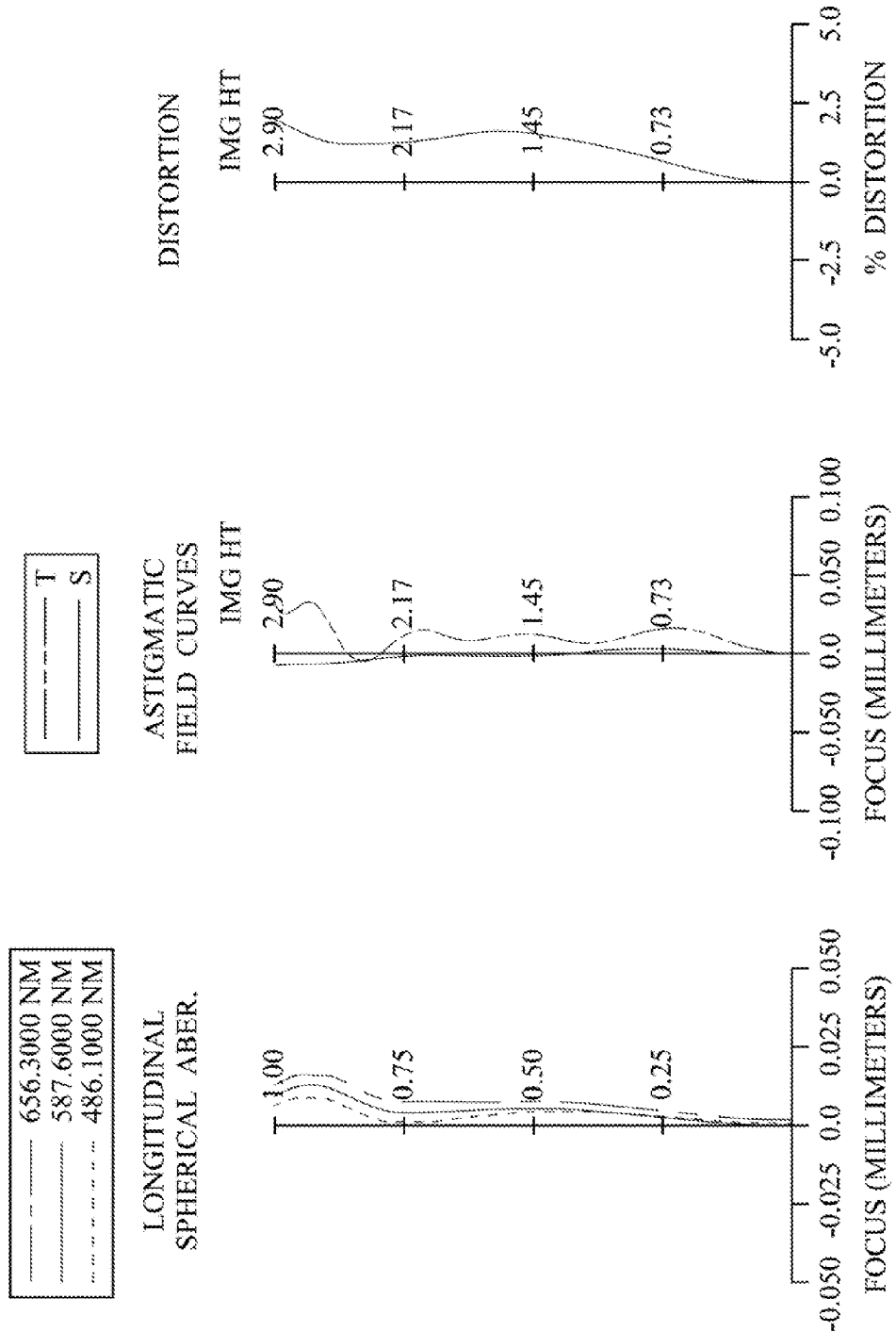
FIG. 4 shows spherical aberration curves, astigmatic field curves and a distortion curve of the imaging lens assembly according to the 2nd embodiment.

FIG. 3 is a schematic view of an imaging lens assembly according to the 2nd embodiment of the present disclosure. FIG. 4 shows spherical aberration curves, astigmatic field curves and a distortion curve of the imaging lens assembly according to the 2nd embodiment. In FIG. 3, the imaging lens assembly includes, in order from an object side to an image side, a first lens element 210, an aperture stop 200, a second lens element 220, a third lens element 230, a fourth lens element 240, a fifth lens element 250, a sixth lens element 260, an IR-cut filter 280, an image plane 270 and an image sensor 290.

The first lens element 210 with negative refractive power has a convex object-side surface 211 and a concave image-side surface 212. The first lens element 210 is made of plastic material and has the object-side surface 211 and the image-side surface 212 being aspheric.

The second lens element 220 with positive refractive power has a convex object-side surface 221 and a convex image-side surface 222. The second lens element 220 is made of plastic material and has the object-side surface 221 and the image-side surface 222 being aspheric. An axial distance between the second lens element 220 and the third lens element 230 is T23, and T23 is the largest among all the axial distances of the lens elements with refractive power.

The third lens element 230 with negative refractive power has a concave object-side surface 231 and a convex image-side surface 232. The third lens element 230 is made of plastic material and has the object-side surface 231 and the image-side surface 232 being aspheric.

The fourth lens element 240 with positive refractive power has a convex object-side surface 241 and a concave image-side surface 242, wherein the object-side surface 241 changes from convex at a paraxial region to concave at a peripheral region, and the image-side surface 242 changes from concave at a paraxial region to convex at a peripheral region, and at least one inflection point is formed on the object-side surface 241 and the image-side surface 242 thereof. The fourth lens element 240 is made of plastic material and has the object-side surface 241 and the image-side surface 242 being aspheric.

The fifth lens element 250 with positive refractive power has a convex object-side surface 251 and a convex image-side surface 252, wherein the image-side surface 252 changes from convex to concave, then from concave to convex from a paraxial region to a peripheral region, and at least one inflection point is formed on the object-side surface 251 and the image-side surface 252 thereof. The fifth lens element 250 is made of plastic material and has the object-side surface 251 and the image-side surface 252 being aspheric.

The sixth lens element 260 with negative refractive power has a convex object-side surface 261 and a concave image-side surface 262, wherein at least one inflection point is formed on the object-side surface 261 and the image-side surface 262 thereof. The sixth lens element 260 is made of plastic material and has the object-side surface 261 and the image-side surface 262 being aspheric.

The IR-cut filter 280 made of glass material is located between the sixth lens element 260 and the image plane 270, and will not affect the focal length of the imaging lens assembly.

The detailed optical data of the 2nd embodiment are shown in Table 3 and the aspheric surface data are shown in Table 4 below.

TABLE 3

2nd Embodiment
f = 3.60 mm, Fno = 2.20, HFOV = 38.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.937 | ASP | 0.250 | Plastic | 1.607 | 26.6 | −6.93 |
| 2 | | 1.262 | ASP | 0.238 | | | | |
| 3 | Ape. Stop | Plano | | −0.188 | | | | |
| 4 | Lens 2 | 1.389 | ASP | 0.698 | Plastic | 1.544 | 55.9 | 2.26 |
| 5 | | −8.846 | ASP | 0.550 | | | | |
| 6 | Lens 3 | −2.057 | ASP | 0.300 | Plastic | 1.640 | 23.3 | −7.40 |
| 7 | | −3.844 | ASP | 0.204 | | | | |
| 8 | Lens 4 | 1.984 | ASP | 0.271 | Plastic | 1.544 | 55.9 | 29.91 |
| 9 | | 2.151 | ASP | 0.208 | | | | |
| 10 | Lens 5 | 23.736 | ASP | 0.371 | Plastic | 1.535 | 56.3 | 3.72 |
| 11 | | −2.156 | ASP | 0.167 | | | | |
| 12 | Lens 6 | 2.061 | ASP | 0.473 | Plastic | 1.535 | 56.3 | −3.30 |
| 13 | | 0.875 | ASP | 0.600 | | | | |
| 14 | IR-cut filter | Plano | | 0.200 | Glass | 1.517 | 64.2 | — |
| 15 | | Plano | | 0.321 | | | | |
| 16 | Image Plane | Plano | | — | | | | |

Reference wavelength (d-line) is 587.6 nm 7.6 nm

TABLE 4

Aspheric Coefficients

| | Surface # | | | |
|---|---|---|---|---|
| | 1 | 2 | 4 | 5 |
| k = | −3.0660E+00 | −8.1143E−01 | −1.7911E+00 | 9.9950E+00 |
| A4 = | −5.3171E−02 | −1.6728E−01 | −2.5913E−02 | −5.8301E−02 |
| A6 = | −6.5256E−03 | 1.5025E−02 | 3.3090E−03 | −7.6982E−04 |
| A8 = | 4.0191E−02 | 1.2033E−01 | 3.1288E−02 | −7.1996E−02 |
| A10 = | −8.9933E−02 | −2.2750E−01 | −2.0533E−02 | 8.8314E−02 |
| A12 = | 8.2224E−02 | 2.7828E−01 | 1.9706E−03 | −4.7551E−02 |
| A14 = | −2.8374E−02 | −1.3384E−01 | | |

| | Surface # | | | |
|---|---|---|---|---|
| | 6 | 7 | 8 | 9 |
| k = | 2.9045E+00 | −3.7500E+00 | −1.5186E+00 | −1.2106E+01 |
| A4 = | −7.7717E−02 | −1.0074E−01 | −1.2556E−02 | 1.7642E−01 |
| A6 = | −3.7749E−03 | −1.5352E−01 | −1.7060E−01 | −3.5191E−01 |
| A8 = | −1.4182E−01 | 2.4931E−01 | 1.2300E−01 | 1.8648E−01 |
| A10 = | 6.5556E−02 | −7.3794E−02 | −1.5607E−02 | 4.0780E−03 |
| A12 = | −5.3494E−01 | 1.3068E−02 | −1.6678E−02 | −4.0723E−02 |
| A14 = | 1.5634E−01 | −2.0858E−03 | 4.9765E−03 | 1.4364E−02 |
| A16 = | | | | −1.5513E−03 |

| | Surface # | | | |
|---|---|---|---|---|
| | 10 | 11 | 12 | 13 |
| k = | −9.2399E+00 | −1.2086E+00 | −1.0490E+01 | −4.1873E+00 |
| A4 = | 3.2030E−01 | 4.3213E−01 | −1.8639E−01 | −1.5788E−01 |
| A6 = | −3.3568E−01 | −2.6958E−01 | 5.6500E−02 | 9.4529E−02 |
| A8 = | 1.3030E−01 | 7.8765E−02 | 1.8882E−02 | −4.0574E−02 |
| A10 = | −1.4472E−02 | −8.2648E−03 | −1.4735E−02 | 1.1009E−02 |
| A12 = | −7.3710E−03 | −1.0707E−03 | 3.4317E−03 | −1.8334E−03 |
| A14 = | 2.8586E−03 | 3.1101E−04 | −3.5273E−04 | 1.7431E−04 |
| A16 = | −2.8412E−04 | −1.7711E−05 | 1.3389E−05 | −7.2562E−06 |

In the imaging lens assembly according to the 2nd embodiment, the definitions of the following parameters are the same as those stated in the 1st embodiment with corresponding values for the 2nd embodiment. Moreover, these parameters can be calculated from Table 3 and Table 4 as the following values and satisfy the following relationships:

| f (mm) | 3.60 | |R12/R11| | 0.42 |
|---|---|---|---|
| Fno | 2.20 | f2/f1 | −0.33 |
| HFOV (deg.) | 38.3 | f12/f2 | 1.56 |
| V3/V2 | 0.42 | f/f6 | −1.09 |
| (CT3 + CT4 + CT5)/f | 0.26 | Yc62/f | 0.38 |
| (R1 − R2)/(R1 + R2) | 0.21 | ImgH/f | 0.81 |
| (R3 + R4)/(R3 − R4) | −0.73 | BL/ImgH | 0.39 |
| (R9 + R10)/(R9 − R10) | 0.83 | TTL/ImgH | 1.58 |

3rd Embodiment

Figure 5:
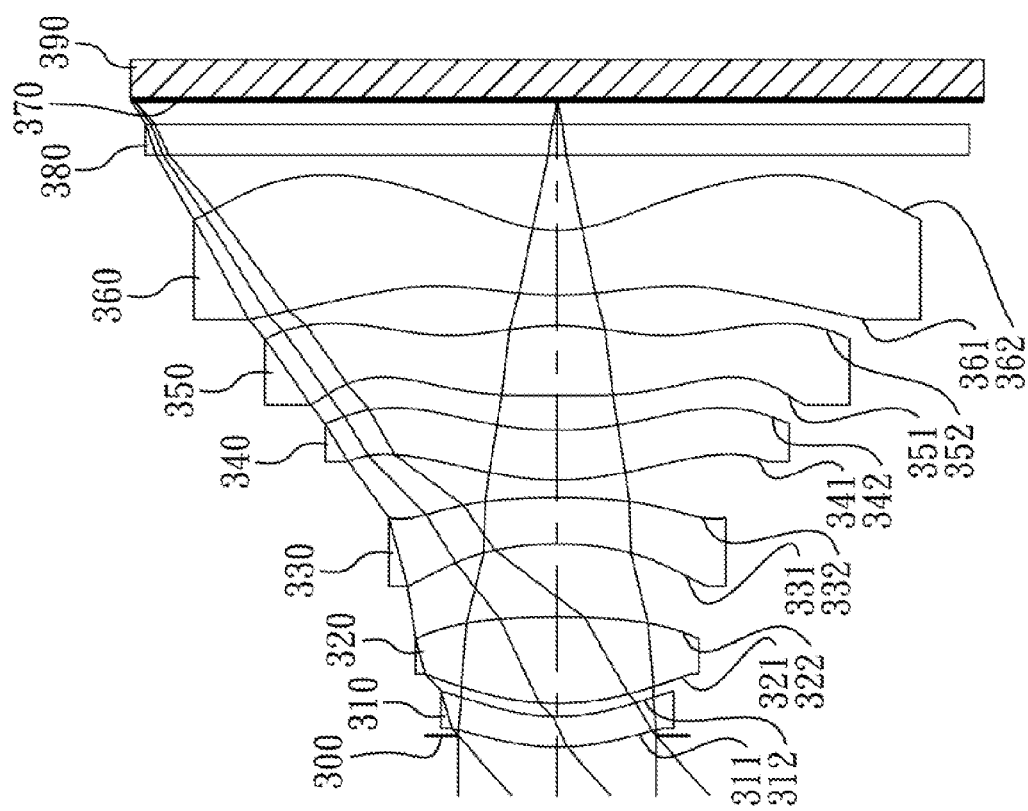
FIG. 5 is a schematic view of an imaging lens assembly according to the 3rd embodiment of the present disclosure.
Figure 6:
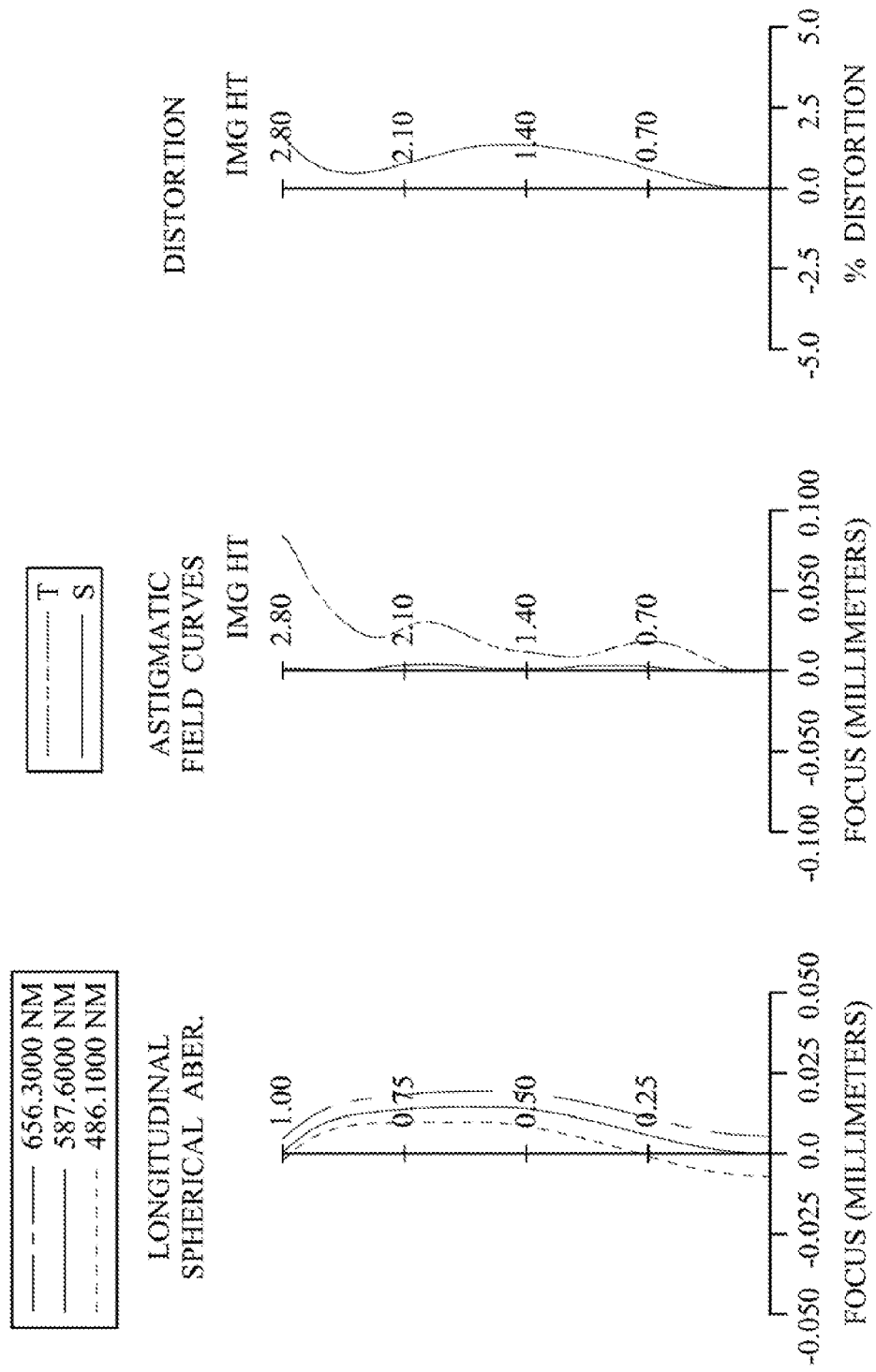
FIG. 6 shows spherical aberration curves, astigmatic field curves and a distortion curve of the imaging lens assembly according to the 3rd embodiment.

FIG. 5 is a schematic view of an imaging lens assembly according to the 3rd embodiment of the present disclosure. FIG. 6 shows spherical aberration curves, astigmatic field curves and a distortion curve of the imaging lens assembly according to the 3rd embodiment. In FIG. 5, the imaging lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 380, an image plane 370 and an image sensor 390.

The first lens element 310 with negative refractive power has a convex object-side surface 311 and a concave image-side surface 312. The first lens element 310 is made of plastic material and has the object-side surface 311 and the image-side surface 312 being aspheric.

The second lens element 320 with positive refractive power has a convex object-side surface 321 and a convex image-side surface 322. The second lens element 320 is made of plastic material and has the object-side surface 321 and the image-side surface 322 being aspheric. An axial distance between the second lens element 320 and the third lens element 330 is T23, and T23 is the largest among all the axial distances of the lens elements with refractive power.

The third lens element 330 with negative refractive power has a concave object-side surface 331 and a convex image-side surface 332. The third lens element 330 is made of plastic material and has the object-side surface 331 and the image-side surface 332 being aspheric.

The fourth lens element 340 with positive refractive power has a convex object-side surface 341 and a concave image-side surface 342, wherein the object-side surface 341 changes from convex at a paraxial region to concave at a peripheral region, and the image-side surface 342 changes from concave at a paraxial region to convex at a peripheral region, and at least one inflection point is formed on the object-side surface 341 and the image-side surface 342 thereof. The fourth lens element 340 is made of plastic material and has the object-side surface 341 and the image-side surface 342 being aspheric.

The fifth lens element 350 with positive refractive power has a concave object-side surface 351 and a convex image-side surface 352, wherein the image-side surface 352 changes from convex to concave, then from concave to convex from a paraxial region to a peripheral region, and at least one inflection point is formed on the object-side surface 351 and the image-side surface 352 thereof. The fifth lens element 350 is made of plastic material and has the object-side surface 351 and the image-side surface 352 being aspheric.

The sixth lens element 360 with negative refractive power has a convex object-side surface 361 and a concave image-side surface 362, wherein at least one inflection point is formed on the object-side surface 361 and the image-side surface 362 thereof. The sixth lens element 360 is made of plastic material and has the object-side surface 361 and the image-side surface 362 being aspheric.

The IR-cut filter 380 made of glass material is located between the sixth lens element 360 and the image plane 370, and will not affect the focal length of the imaging lens assembly.

The detailed optical data of the 3rd embodiment are shown in Table 5 and the aspheric surface data are shown in Table 6 below.

TABLE 5

3rd Embodiment
f = 3.14 mm, Fno = 2.40, HFOV = 41.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.074 | | | | |
| 2 | Lens 1 | 1.562 | ASP | 0.200 | Plastic | 1.634 | 23.8 | −17.22 |
| 3 | | 1.298 | ASP | 0.088 | | | | |
| 4 | Lens 2 | 1.770 | ASP | 0.566 | Plastic | 1.544 | 55.9 | 2.60 |
| 5 | | −6.269 | ASP | 0.487 | | | | |
| 6 | Lens 3 | −2.213 | ASP | 0.303 | Plastic | 1.650 | 21.4 | −6.19 |
| 7 | | −5.184 | ASP | 0.118 | | | | |
| 8 | Lens 4 | 1.932 | ASP | 0.332 | Plastic | 1.544 | 55.9 | 12.06 |
| 9 | | 2.572 | ASP | 0.227 | | | | |
| 10 | Lens 5 | −34.287 | ASP | 0.463 | Plastic | 1.535 | 56.3 | 3.18 |
| 11 | | −1.628 | ASP | 0.202 | | | | |
| 12 | Lens 6 | 2.290 | ASP | 0.424 | Plastic | 1.544 | 55.9 | −2.53 |
| 13 | | 0.804 | ASP | 0.500 | | | | |
| 14 | IR-cut filter | Plano | | 0.200 | Glass | 1.517 | 64.2 | — |
| 15 | | Plano | | 0.165 | | | | |
| 16 | Image Plane | Plano | | — | | | | |

Reference wavelength (d-line) is 587.6 nm

TABLE 6

Aspheric Coefficients

| Surface # | 2 | 3 | 4 | 5 |
|---|---|---|---|---|
| k = | −3.0475E+00 | −7.3825E−01 | −1.2964E+00 | 9.9629E+00 |
| A4 = | −5.9921E−02 | −1.6109E−01 | −1.3602E−02 | −7.5637E−02 |
| A6 = | −3.6047E−02 | −4.4051E−02 | −1.2858E−02 | −4.6253E−03 |
| A8 = | −1.1910E−02 | 6.5536E−02 | −2.7485E−02 | −7.9482E−02 |
| A10 = | −1.1242E−01 | −2.4132E−01 | 2.4823E−02 | 1.2865E−01 |
| A12 = | 1.1213E−01 | 2.8414E−01 | −1.2108E−02 | −6.5186E−02 |
| A14 = | 1.8700E−02 | −1.1039E−01 | | |

| Surface # | 6 | 7 | 8 | 9 |
|---|---|---|---|---|
| k = | 2.8707E+00 | −2.0000E+01 | −8.5297E−01 | −7.9660E+00 |
| A4 = | −5.9103E−02 | −7.7824E−02 | −3.0545E−02 | 1.7727E−01 |
| A6 = | −1.8470E−02 | −1.5808E−01 | −1.6486E−01 | −3.5411E−01 |
| A8 = | −1.5360E−01 | 2.4902E−01 | 1.2443E−01 | 1.8471E−01 |
| A10 = | 6.4669E−01 | −7.2128E−02 | −1.6402E−02 | 3.9442E−03 |
| A12 = | −5.3786E−01 | 1.2385E−02 | −1.7065E−02 | −4.0608E−02 |
| A14 = | 1.4863E−01 | −7.3239E−03 | 5.0503E−03 | 1.4395E−02 |
| A16 = | | | | −1.5434E−03 |

| Surface # | 10 | 11 | 12 | 13 |
|---|---|---|---|---|
| k = | −4.8721E+00 | −2.6694E+00 | −3.3672E+00 | −3.5711E+00 |
| A4 = | 3.5949E−01 | 4.3630E−01 | −2.1345E−01 | −1.5581E−01 |
| A6 = | −3.5004E−01 | −2.7586E−01 | 5.5319E−02 | 9.5017E−02 |
| A8 = | 1.3009E−01 | 7.8508E−02 | 1.9220E−02 | −4.0468E−02 |
| A10 = | −1.4227E−02 | −8.0705E−03 | −1.4674E−02 | 1.0954E−02 |
| A12 = | −7.2892E−03 | −1.0484E−03 | 3.4448E−03 | −1.8419E−03 |
| A14 = | 2.8577E−03 | 3.0977E−04 | −3.5290E−04 | 1.7465E−04 |
| A16 = | −2.8268E−04 | −1.8454E−05 | 1.2879E−05 | −7.0263E−06 |

In the imaging lens assembly according to the 3rd embodiment, the definitions of the following parameters are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f (mm) | 3.14 | |R12/R11| | 0.35 |
| Fno | 2.40 | f2/f1 | −0.15 |
| HFOV (deg.) | 41.2 | f12/f2 | 1.24 |
| V3/V2 | 0.38 | f/f6 | −1.24 |
| (CT3 + CT4 + CT5)/f | 0.35 | Yc62/f | 0.48 |
| (R1 − R2)/(R1 + R2) | 0.09 | ImgH/f | 0.89 |
| (R3 + R4)/(R3 − R4) | −0.56 | BL/ImgH | 0.31 |
| (R9 + R10)/(R9 − R10) | 1.10 | TTL/ImgH | 1.50 |

4th Embodiment

Figure 7:
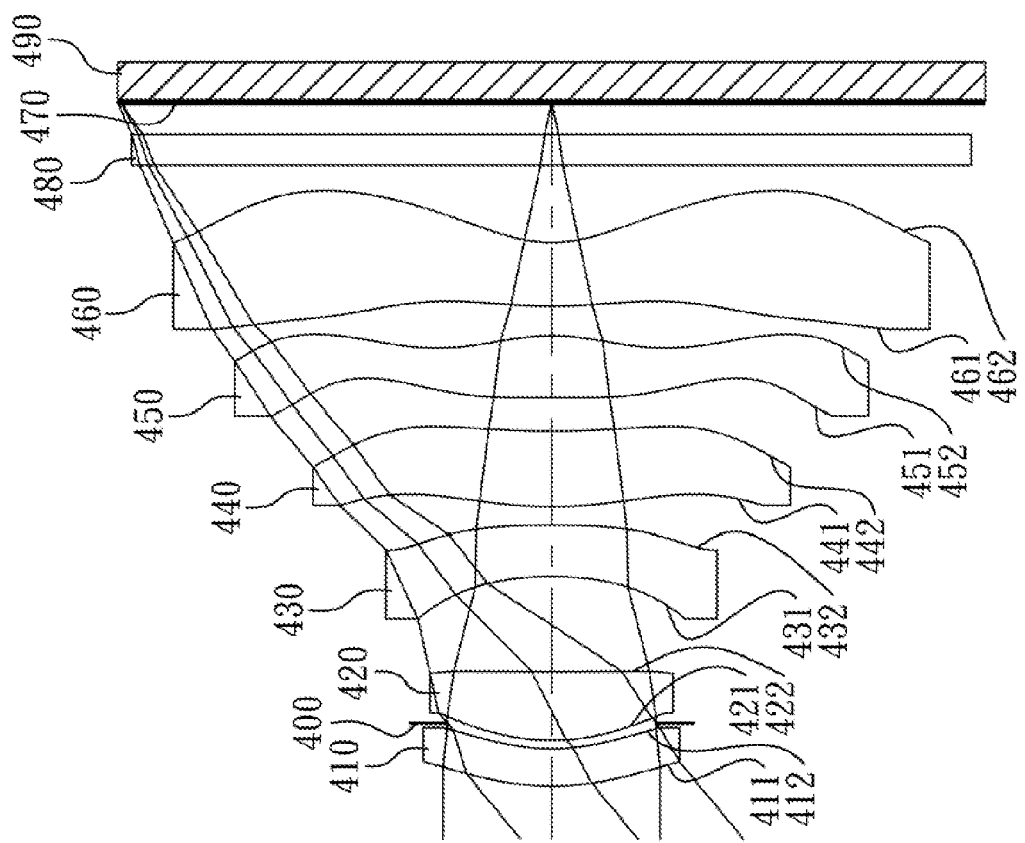
FIG. 7 is a schematic view of an imaging lens assembly according to the 4th embodiment of the present disclosure.
Figure 8:
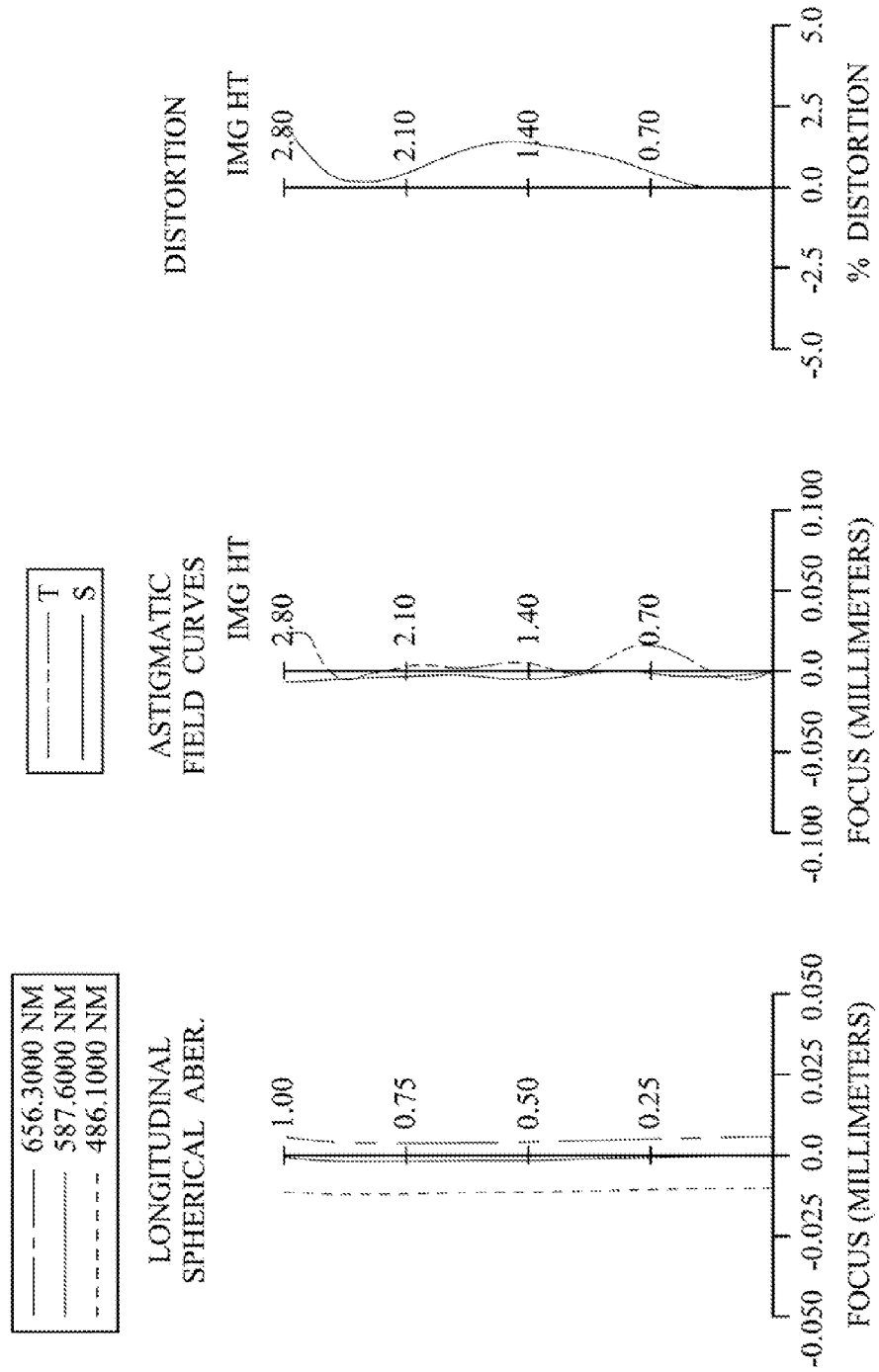
FIG. 8 shows spherical aberration curves, astigmatic field curves and a distortion curve of the imaging lens assembly according to the 4th embodiment.

FIG. 7 is a schematic view of an imaging lens assembly according to the 4th embodiment of the present disclosure. FIG. 8 shows spherical aberration curves, astigmatic field curves and a distortion curve of the imaging lens assembly according to the 4th embodiment. In FIG. 7, the imaging lens assembly includes, in order from an object side to an image side, a first lens element 410, an aperture stop 400, a second lens element 420, a third lens element 430, a fourth lens element 440, a fifth lens element 450, a sixth lens element 460, an IR-cut filter 480, an image plane 470 and an image sensor 490.

The first lens element 410 with negative refractive power has a convex object-side surface 411 and a concave image-side surface 412. The first lens element 410 is made of plastic material and has the object-side surface 411 and the image-side surface 412 being aspheric.

The second lens element 420 with positive refractive power has a convex object-side surface 421 and a concave image-side surface 422. The second lens element 420 is made of glass material and has the object-side surface 421 and the image-side surface 422 being aspheric. An axial distance between the second lens element 420 and the third lens element 430 is T23, and T23 is the largest among all the axial distances of the lens elements with refractive power.

The third lens element 430 with negative refractive power has a concave object-side surface 431 and a convex image-side surface 432. The third lens element 430 is made of plastic material and has the object-side surface 431 and the image-side surface 432 being aspheric.

The fourth lens element 440 with positive refractive power has a convex object-side surface 441 and a concave image-side surface 442, wherein the object-side surface 441 changes from convex at a paraxial region to concave at a peripheral region, and the image-side surface 442 changes from concave at a paraxial region to convex at a peripheral region, and at least one inflection point is formed on the object-side surface 441 and the image-side surface 442 thereof. The fourth lens element 440 is made of plastic material and has the object-side surface 441 and the image-side surface 442 being aspheric.

The fifth lens element 450 with positive refractive power has a concave object-side surface 451 and a convex image-side surface 452, wherein the image-side surface 452 changes from convex to concave, then from concave to convex from a paraxial region to a peripheral region, and at least one inflection point is formed on the object-side surface 451 and the image-side surface 452 thereof. The fifth lens element 450 is made of plastic material and has the object-side surface 451 and the image-side surface 452 being aspheric.

The sixth lens element 460 with negative refractive power has a convex object-side surface 461 and a concave image-side surface 462, wherein at least one inflection point is formed on the object-side surface 461 and the image-side surface 462 thereof. The sixth lens element 460 is made of plastic material and has the object-side surface 461 and the image-side surface 462 being aspheric.

The IR-cut filter 480 made of glass material is located between the sixth lens element 460 and the image plane 470, and will not affect the focal length of the imaging lens assembly.

The detailed optical data of the 4th embodiment are shown in Table 7 and the aspheric surface data are shown in Table 8 below.

TABLE 7

4th Embodiment
f = 3.38 mm, Fno = 2.40, HFOV = 39.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.739 | ASP | 0.243 | Plastic | 1.530 | 55.8 | −15.42 |
| 2 | | 1.364 | ASP | 0.167 | | | | |
| 3 | Ape. Stop | Plano | | −0.113 | | | | |
| 4 | Lens 2 | 1.364 | ASP | 0.447 | Glass | 1.542 | 62.9 | 2.65 |
| 5 | | 22.925 | ASP | 0.620 | | | | |
| 6 | Lens 3 | −2.071 | ASP | 0.330 | Plastic | 1.640 | 23.3 | −4.71 |
| 7 | | −7.020 | ASP | 0.121 | | | | |
| 8 | Lens 4 | 2.851 | ASP | 0.496 | Plastic | 1.544 | 55.9 | 7.23 |
| 9 | | 9.730 | ASP | 0.212 | | | | |
| 10 | Lens 5 | −27.789 | ASP | 0.406 | Plastic | 1.544 | 55.9 | 2.73 |
| 11 | | −1.420 | ASP | 0.193 | | | | |
| 12 | Lens 6 | 3.278 | ASP | 0.413 | Plastic | 1.544 | 55.9 | −2.14 |
| 13 | | 0.822 | ASP | 0.500 | | | | |
| 14 | IR-cut filter | Plano | | 0.200 | Glass | 1.517 | 64.2 | — |
| 15 | | Plano | | 0.212 | | | | |
| 16 | Image Plane | Plano | | — | | | | |

Reference wavelength (d-line) is 587.6 nm

TABLE 8

Aspheric Coefficients

| | Surface # | | | |
|---|---|---|---|---|
| | 1 | 2 | 4 | 5 |
| k = | −1.9361E+00 | −1.0116E+00 | −1.7916E+00 | −1.0000E+00 |
| A4 = | −4.3241E−02 | −1.7893E−01 | −2.6502E−02 | −2.8198E−02 |
| A6 = | −2.3530E−02 | −1.7630E−02 | −9.9954E−04 | −8.9490E−03 |
| A8 = | 2.3902E−02 | 9.1137E−02 | 1.6302E−02 | −7.9750E−02 |
| A10 = | −9.7529E−02 | −2.3692E−01 | 3.0709E−02 | 1.0903E−01 |
| A12 = | 9.5146E−02 | 2.7131E−01 | −1.3152E−01 | −1.9632E−01 |
| A14 = | −2.7874E−02 | −1.0677E−01 | | |

| | Surface # | | | |
|---|---|---|---|---|
| | 6 | 7 | 8 | 9 |
| k = | 2.8784E+00 | 6.4970E+00 | −4.5808E−01 | −2.0000E+01 |
| A4 = | −8.9347E−02 | −1.1055E−01 | −3.4694E−02 | 1.4528E−01 |
| A6 = | −3.0132E−02 | −1.5533E−01 | −1.6381E−01 | −3.5046E−01 |
| A8 = | −1.5805E−01 | 2.4902E−01 | 1.2506E−01 | 1.8604E−01 |
| A10 = | 6.3563E−01 | −7.2215E−02 | −1.6408E−02 | 4.5359E−03 |
| A12 = | −5.6597E−01 | 1.3599E−02 | −1.6804E−02 | −4.0498E−02 |
| A14 = | 1.2807E−01 | −4.9999E−03 | 5.3584E−03 | 1.4382E−02 |
| A16 = | | | | −1.5684E−03 |

| | Surface # | | | |
|---|---|---|---|---|
| | 10 | 11 | 12 | 13 |
| k = | 9.7060E+00 | −2.6336E+00 | −7.8542E+00 | −4.1431E+00 |
| A4 = | 3.5369E−01 | 4.4905E−01 | −1.9006E−01 | −1.4718E−01 |
| A6 = | −3.4228E−01 | −2.7727E−01 | 5.5811E−02 | 9.2791E−02 |
| A8 = | 1.3114E−01 | 7.8462E−02 | 1.8825E−02 | −4.0601E−02 |
| A10 = | −1.4384E−02 | −8.1178E−03 | −1.4737E−02 | 1.1000E−02 |

TABLE 8-continued

Aspheric Coefficients

| A12 = | −7.4001E−03 | −1.0549E−03 | 3.4398E−03 | −1.8353E−03 |
|---|---|---|---|---|
| A14 = | 2.8296E−03 | 3.1026E−04 | −3.5188E−04 | 1.7439E−04 |
| A16 = | −2.8649E−04 | −1.8110E−05 | 1.3193E−05 | −7.1406E−06 |

In the imaging lens assembly according to the 4th embodiment, the definitions of the following parameters are the same as those stated in the 1st embodiment with corresponding values for the 4th embodiment. Moreover, these parameters can be calculated from Table 7 and Table 8 as the following values and satisfy the following relationships:

| f (mm) | 3.38 | |R12/R11| | 0.25 |
|---|---|---|---|
| Fno | 2.40 | f2/f1 | −0.17 |
| HFOV (deg.) | 39.1 | f12/f2 | 1.28 |
| V3/V2 | 0.37 | f/f6 | −1.58 |
| (CT3 + CT4 + CT5)/f | 0.36 | Yc62/f | 0.44 |
| (R1 − R2)/(R1 + R2) | 0.12 | ImgH/f | 0.83 |
| (R3 + R4)/(R3 − R4) | −1.13 | BL/ImgH | 0.33 |
| (R9 + R10)/(R9 − R10) | 1.11 | TTL/ImgH | 1.56 |

5th Embodiment

Figure 9:
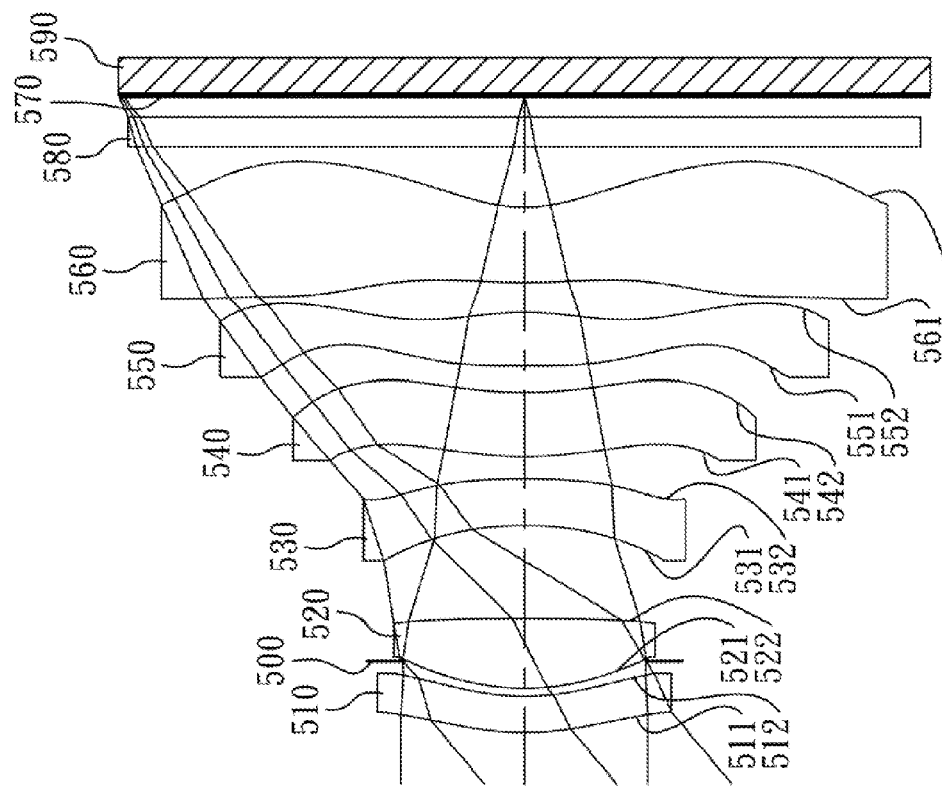
FIG. 9 is a schematic view of an imaging lens assembly according to the 5th embodiment of the present disclosure.
Figure 10:
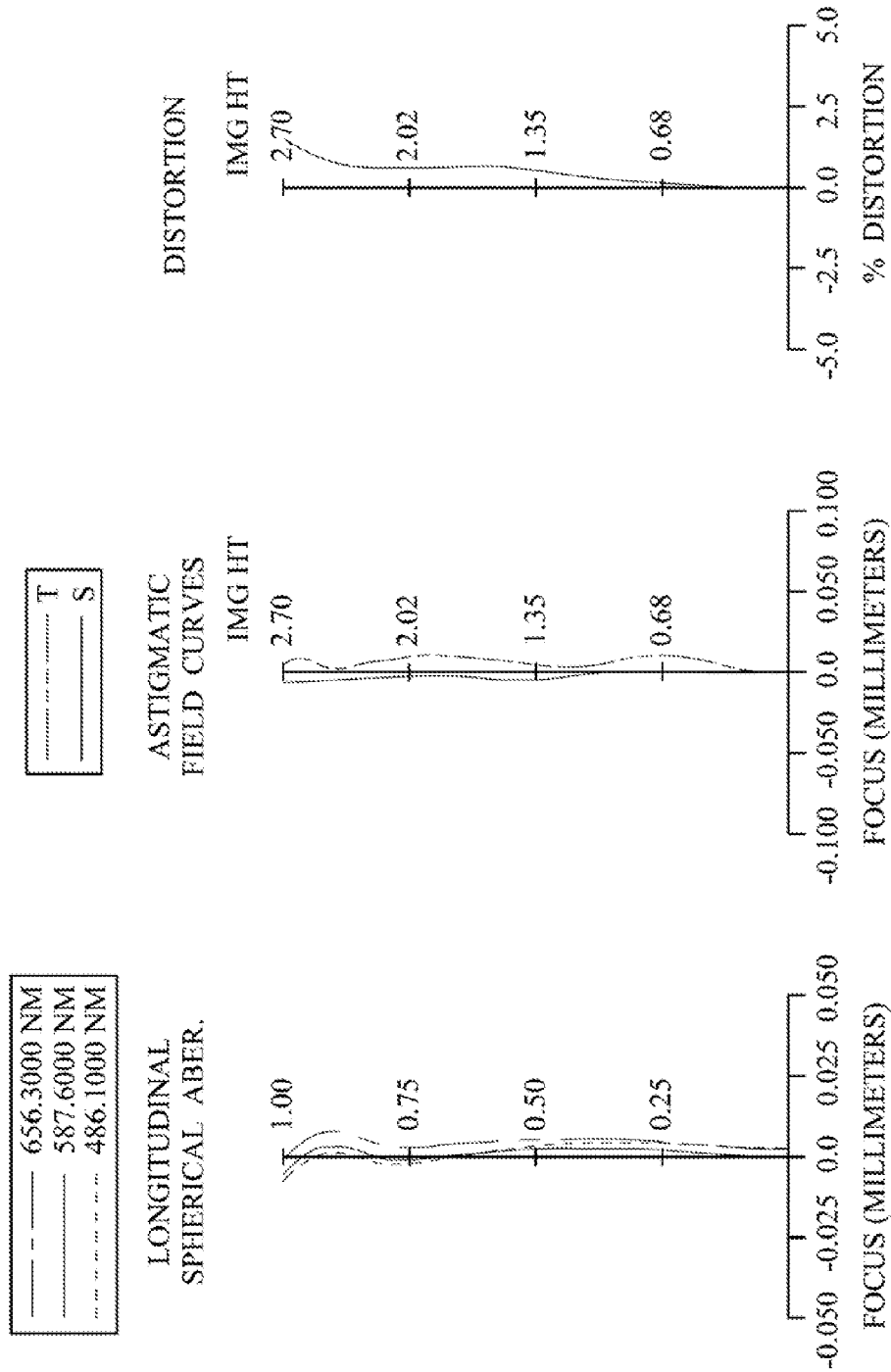
FIG. 10 shows spherical aberration curves, astigmatic field curves and a distortion curve of the imaging lens assembly according to the 5th embodiment.

FIG. 9 is a schematic view of an imaging lens assembly according to the 5th embodiment of the present disclosure. FIG. 10 shows spherical aberration curves, astigmatic field curves and a distortion curve of the imaging lens assembly according to the 5th embodiment. In FIG. 9, the imaging lens assembly includes, in order from an object side to an image side, a first lens element 510, an aperture stop 500, a second lens element 520, a third lens element 530, a fourth lens element 540, a fifth lens element 550, a sixth lens element 560, an IR-cut filter 580, an image plane 570 and an image sensor 590.

The first lens element 510 with negative refractive power has a convex object-side surface 511 and a concave image-side surface 512. The first lens element 510 is made of plastic material and has the object-side surface 511 and the image-side surface 512 being aspheric.

The second lens element 520 with positive refractive power has a convex object-side surface 521 and a convex image-side surface 522. The second lens element 520 is made of glass material and has the object-side surface 521 and the image-side surface 522 being aspheric. An axial distance between the second lens element 520 and the third lens element 530 is T23, and T23 is the largest among all the axial distances of the lens elements with refractive power.

The third lens element 530 with negative refractive power has a concave object-side surface 531 and a convex image-side surface 532. The third lens element 530 is made of plastic material and has the object-side surface 531 and the image-side surface 532 being aspheric.

The fourth lens element 540 with positive refractive power has a convex object-side surface 541 and a concave image-side surface 542, wherein the object-side surface 541 changes from convex at a paraxial region to concave at a peripheral region, and the image-side surface 542 changes from concave at a paraxial region to convex at a peripheral region, and at least one inflection point is formed on the object-side surface 541 and the image-side surface 542 thereof. The fourth lens element 540 is made of plastic material and has the object-side surface 541 and the image-side surface 542 being aspheric.

The fifth lens element 550 with positive refractive power has a convex object-side surface 551 and a convex image-side surface 552, wherein the image-side surface 552 changes from convex to concave, then from concave to convex from a paraxial region to a peripheral region, and at least one inflection point is formed on the object-side surface 551 and the image-side surface 552 thereof. The fifth lens element 550 is made of plastic material and has the object-side surface 551 and the image-side surface 552 being aspheric.

The sixth lens element 560 with negative refractive power has a convex object-side surface 561 and a concave image-side surface 562, wherein at least one inflection point is formed on the object-side surface 561 and the image-side surface 562 thereof. The sixth lens element 560 is made of plastic material and has the object-side surface 561 and the image-side surface 562 being aspheric.

The IR-cut filter 580 made of glass material is located between the sixth lens element 560 and the image plane 570, and will not affect the focal length of the imaging lens assembly.

The detailed optical data of the 5th embodiment are shown in Table 9 and the aspheric surface data are shown in Table 10 below.

TABLE 9

5th Embodiment
f = 3.21 mm, Fno = 1.95, HFOV = 39.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.018 | ASP | 0.240 | Plastic | 1.650 | 21.4 | −14.81 |
| 2 | | 1.590 | ASP | 0.236 | | | | |
| 3 | Ape. Stop | Plano | | −0.182 | | | | |
| 4 | Lens 2 | 1.606 | ASP | 0.466 | Glass | 1.592 | 68.4 | 2.58 |
| 5 | | −28.043 | ASP | 0.621 | | | | |
| 6 | Lens 3 | −2.519 | ASP | 0.309 | Plastic | 1.650 | 21.4 | −7.45 |
| 7 | | −5.508 | ASP | 0.150 | | | | |
| 8 | Lens 4 | 2.569 | ASP | 0.432 | Plastic | 1.544 | 55.9 | 15.80 |
| 9 | | 3.448 | ASP | 0.175 | | | | |
| 10 | Lens 5 | 24.905 | ASP | 0.362 | Plastic | 1.544 | 55.9 | 3.18 |
| 11 | | −1.851 | ASP | 0.198 | | | | |

TABLE 9-continued

5th Embodiment
f = 3.21 mm, Fno = 1.95, HFOV = 39.6 deg.

| Surface # | | Curvature Radius | | Thickness | Material | Index | Abbe # | Focal length |
|---|---|---|---|---|---|---|---|---|
| 12 | Lens 6 | 4.919 | ASP | 0.502 | Plastic | 1.544 | 55.9 | −2.33 |
| 13 | | 0.972 | ASP | 0.400 | | | | |
| 14 | IR-cut filter | Plano | | 0.200 | Glass | 1.517 | 64.2 | — |
| 15 | | Plano | | 0.150 | | | | |
| 16 | Image Plane | Plano | | — | | | | |

Reference wavelength (d-line) is 587.6 nm

TABLE 10

Aspheric Coefficients

| | Surface # | | | |
|---|---|---|---|---|
| | 1 | 2 | 4 | 5 |
| k = | −3.1714E+00 | −6.7060E−01 | −1.5080E+00 | −2.0000E+01 |
| A4 = | −6.0455E−02 | −1.5974E−01 | −1.6535E−02 | −2.5877E−02 |
| A6 = | −3.0128E−02 | −2.6528E−02 | 2.0884E−02 | 1.7314E−02 |
| A8 = | 2.5953E−02 | 9.8189E−02 | −1.1368E−02 | −5.9402E−02 |
| A10 = | −8.6217E−02 | −2.2381E−01 | 6.2743E−02 | 1.1582E−01 |
| A12 = | 1.0964E−01 | 2.9560E−01 | −7.0260E−02 | −1.1168E−01 |
| A14 = | −4.2892E−02 | −1.4118E−01 | | |

| | Surface # | | | |
|---|---|---|---|---|
| | 6 | 7 | 8 | 9 |
| k = | 3.4387E+00 | −3.6550E+00 | −2.0083E+00 | −2.0000E+01 |
| A4 = | −6.4063E−02 | −9.3251E−02 | −4.5080E−02 | 1.5140E−01 |
| A6 = | −1.1110E−02 | −1.4043E−01 | −1.5645E−01 | −3.4810E−01 |
| A8 = | −1.4835E−01 | 2.5564E−01 | 1.2483E−01 | 1.8567E−01 |
| A10 = | 6.4215E−01 | −7.3252E−02 | −2.0172E−02 | 4.0567E−03 |
| A12 = | −5.6528E−01 | 1.0176E−02 | −1.7330E−02 | −4.0837E−02 |
| A14 = | 1.2352E−01 | −6.1412E−03 | 5.3084E−03 | 1.4307E−02 |
| A16 = | | | | −1.5352E−03 |

| | Surface # | | | |
|---|---|---|---|---|
| | 10 | 11 | 12 | 13 |
| k = | −2.0000E+01 | −2.2457E+00 | −6.6419E−01 | −4.6486E+00 |
| A4 = | 3.2559E−01 | 4.3311E−01 | −1.8491E−01 | −1.3827E−01 |
| A6 = | −3.3689E−01 | −2.7418E−01 | 5.5484E−02 | 9.1226E−02 |
| A8 = | 1.3214E−01 | 7.9443E−02 | 1.8697E−02 | −4.0468E−02 |
| A10 = | −1.4549E−02 | −8.1449E−03 | −1.4721E−02 | 1.1007E−02 |
| A12 = | −7.4634E−03 | −1.0852E−03 | 3.4374E−03 | −1.8383E−03 |
| A14 = | 2.8278E−03 | 3.0788E−04 | −3.5194E−04 | 1.7432E−04 |
| A16 = | −2.8423E−04 | −1.7968E−05 | 1.3199E−05 | −7.1113E−06 |

In the imaging lens assembly according to the 5th embodiment, the definitions of the following parameters are the same as those stated in the 1st embodiment with corresponding values for the 5th embodiment. Moreover, these parameters can be calculated from Table 9 and Table 10 as the following values and satisfy the following relationships:

| f (mm) | 3.21 | |R12/R11| | 0.20 |
|---|---|---|---|
| Fno | 1.95 | f2/f1 | −0.17 |
| HFOV (deg.) | 39.6 | f12/f2 | 1.28 |
| V3/V2 | 0.31 | f/f6 | −1.38 |
| (CT3 + CT4 + CT5)/f | 0.34 | Yc62/f | 0.47 |
| (R1 − R2)/(R1 + R2) | 0.12 | ImgH/f | 0.84 |
| (R3 + R4)/(R3 − R4) | −0.89 | BL/ImgH | 0.28 |
| (R9 + R10)/(R9 − R10) | 0.86 | TTL/ImgH | 0.55 |

6th Embodiment

Figure 11:
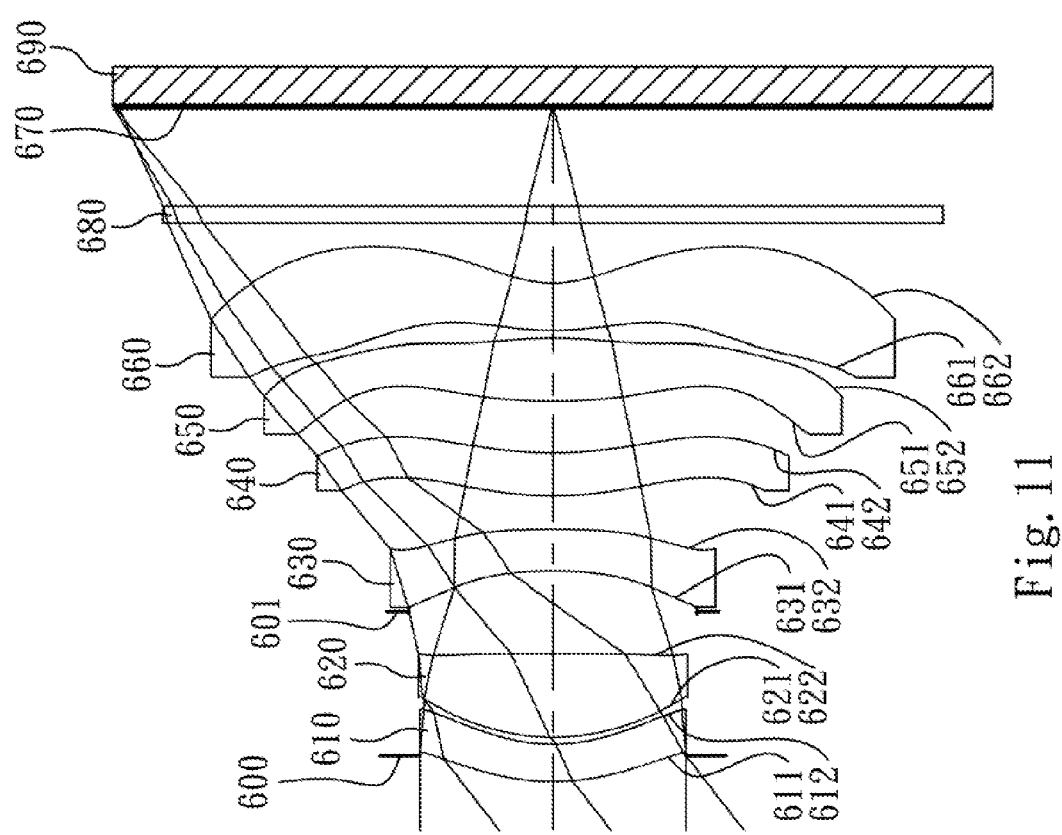
FIG. 11 is a schematic view of an imaging lens assembly according to the 6th embodiment of the present disclosure.
Figure 12:
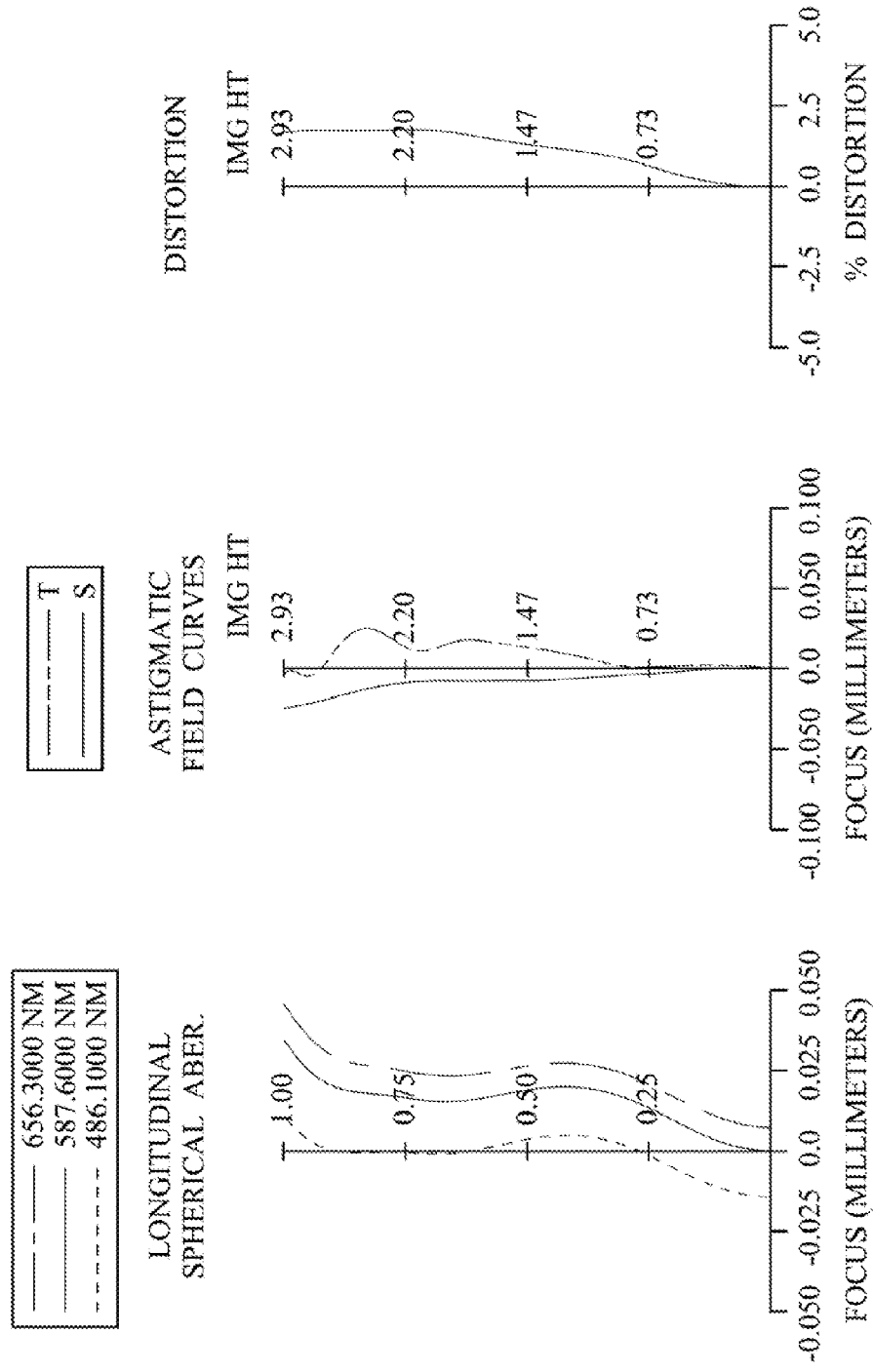
FIG. 12 shows spherical aberration curves, astigmatic field curves and a distortion curve of the imaging lens assembly according to the 6th embodiment.

FIG. 11 is a schematic view of an imaging lens assembly according to the 6th embodiment of the present disclosure. FIG. 12 shows spherical aberration curves, astigmatic field curves and a distortion curve of the imaging lens assembly according to the 6th embodiment. In FIG. 11, the imaging lens assembly includes, in order from an object side to an image side, an aperture stop 600, a first lens element 610, a second lens element 620, a stop 601, a third lens element 630, a fourth lens element 640, a fifth lens element 650, a sixth lens element 660, an IR-cut filter 680, an image plane 670 and an image sensor 690.

The first lens element 610 with negative refractive power has a convex object-side surface 611 and a concave image-side surface 612. The first lens element 610 is made of plastic material and has the object-side surface 611 and the image-side surface 612 being aspheric.

The second lens element 620 with positive refractive power has a convex object-side surface 621 and a convex image-side surface 622. The second lens element 620 is made of plastic material and has the object-side surface 621 and the image-side surface 622 being aspheric. An axial distance between the second lens element 620 and the third lens element 630 is T23, and T23 is the largest among all the axial distances of the lens elements with refractive power.

The third lens element 630 with negative refractive power has a concave object-side surface 631 and a convex image-side surface 632. The third lens element 630 is made of plastic material and has the object-side surface 631 and the image-side surface 632 being aspheric.

The fourth lens element 640 with positive refractive power has a convex object-side surface 641 and a concave image-side surface 642, wherein the object-side surface 641 changes from convex at a paraxial region to concave at a peripheral region, and the image-side surface 642 changes from concave at a paraxial region to convex at a peripheral region, and at least one inflection point is formed on the object-side surface 641 and the image-side surface 642 thereof. The fourth lens element 640 is made of plastic material and has the object-side surface 641 and the image-side surface 642 being aspheric.

The fifth lens element 650 with positive refractive power has a convex object-side surface 651 and a convex image-side surface 662, wherein the image-side surface 652 changes from convex to concave, then from concave to convex from a paraxial region to a peripheral region, and at least one inflection point is formed on the object-side surface 651 and the image-side surface 652 thereof. The fifth lens element 650 is made of plastic material and has the object-side surface 651 and the image-side surface 652 being aspheric.

The sixth lens element 660 with negative refractive power has a convex object-side surface 661 and a concave image-side surface 662, wherein at least one inflection point is formed on the object-side surface 661 and the image-side surface 662 thereof. The sixth lens element 660 is made of plastic material and has the object-side surface 661 and the image-side surface 662 being aspheric.

The IR-cut filter 680 made of glass material is located between the sixth lens element 660 and the image plane 670, and will not affect the focal length of the imaging lens assembly.

The detailed optical data of the 6th embodiment are shown in Table 11 and the aspheric surface data are shown in Table 12 below.

TABLE 11

6th Embodiment
f = 3.69 mm, Fno = 2.08, HFOV = 37.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.172 | | | | |
| 2 | Lens 1 | 1.542 | ASP | 0.250 | Plastic | 1.640 | 23.3 | −12.13 |
| 3 | | 1.205 | ASP | 0.046 | | | | |
| 4 | Lens 2 | 1.446 | ASP | 0.558 | Plastic | 1.544 | 55.9 | 2.63 |
| 5 | | −146.033 | ASP | 0.280 | | | | |
| 6 | Stop | Plano | | 0.270 | | | | |
| 7 | Lens 3 | −2.685 | ASP | 0.281 | Plastic | 1.640 | 23.3 | −7.55 |
| 8 | | −6.293 | ASP | 0.223 | | | | |
| 9 | Lens 4 | 2.473 | ASP | 0.284 | Plastic | 1.640 | 23.3 | 28.49 |
| 10 | | 2.733 | ASP | 0.348 | | | | |
| 11 | Lens 5 | 4.147 | ASP | 0.418 | Plastic | 1.544 | 55.9 | 2.84 |
| 12 | | −2.379 | ASP | 0.050 | | | | |
| 13 | Lens 6 | 1.690 | ASP | 0.320 | Plastic | 1.544 | 55.9 | −2.57 |
| 14 | | 0.714 | ASP | 0.400 | | | | |
| 15 | IR-cut filter | Plano | | 0.110 | Glass | 1.517 | 64.2 | — |
| 16 | | Plano | | 0.668 | | | | |
| 17 | Image Plane | Plano | | — | | | | |

Reference wavelength (d-line) is 587.6 nm

TABLE 12

Aspheric Coefficients

| | Surface # | | | |
|---|---|---|---|---|
| | 2 | 3 | 4 | 5 |
| k = | −1.8242E+00 | −1.0000E+00 | −1.3142E+00 | −1.0000E+02 |
| A4 = | −3.7754E−02 | −1.0193E−01 | −1.3633E−02 | −4.4358E−02 |
| A6 = | −3.4497E−03 | −3.1541E−02 | 4.1536E−02 | 2.1190E−02 |
| A8 = | −3.2383E−02 | 2.5584E−02 | −8.1091E−02 | −7.3875E−02 |
| A10 = | −4.5201E−02 | −1.7303E−01 | 9.3150E−02 | 2.3864E−01 |

TABLE 12-continued

| Aspheric Coefficients | | | | |
|---|---|---|---|---|
| A12 = | 6.9280E−02 | 1.5849E−01 | −1.5301E−02 | −1.1594E−01 |
| A14 = | −2.9405E−02 | −3.7791E−02 | | |

| | Surface # | | | |
|---|---|---|---|---|
| | 7 | 8 | 9 | 10 |
| k = | 3.1970E+00 | 1.1216E+01 | 1.5600E+00 | −1.8071E+01 |
| A4 = | −1.3933E−01 | −1.1506E−01 | −1.6503E−02 | 5.4688E−02 |
| A6 = | −1.3911E−02 | −1.5916E−01 | −1.8300E−01 | −1.3463E−01 |
| A8 = | −9.0847E−02 | 2.8000E−01 | 1.3902E−01 | 7.1237E−02 |
| A10 = | 6.8453E−01 | −5.1944E−02 | −6.2202E−02 | −1.7642E−02 |
| A12 = | −5.8018E−01 | 1.1049E−02 | 1.6976E−02 | 1.6708E−03 |
| A14 = | 1.0979E−01 | −1.8958E−02 | −2.6211E−03 | 2.3021E−05 |

| | Surface # | | | |
|---|---|---|---|---|
| | 11 | 12 | 13 | 14 |
| k = | −2.2576E+01 | 3.0690E−02 | −2.2077E+01 | −4.8606E+00 |
| A4 = | 1.5201E−01 | 5.1852E−01 | −1.6367E−01 | −2.0309E−01 |
| A6 = | −2.3241E−01 | −5.7555E−01 | −3.5221E−02 | 1.1159E−01 |
| A8 = | 1.0533E−01 | 3.0830E−01 | 8.4401E−02 | −3.6108E−02 |
| A10 = | −2.3561E−02 | −8.4898E−02 | −3.4078E−02 | 6.3130E−03 |
| A12 = | 2.2311E−03 | 1.1478E−02 | 5.6601E−03 | −5.4519E−04 |
| A14 = | | −5.9989E−04 | −3.4669E−04 | 1.6949E−05 |

In the imaging lens assembly according to the 6th embodiment, the definitions of the following parameters are the same as those stated in the 1st embodiment with corresponding values for the 6th embodiment. Moreover, these parameters can be calculated from Table 11 and Table 12 as the following values and satisfy the following relationships:

| f (mm) | 3.69 | |R12/R11| | 0.42 |
|---|---|---|---|
| Fno | 2.08 | f2/f1 | −0.22 |
| HFOV (deg.) | 37.9 | f12/f2 | 1.38 |
| V3/V2 | 0.42 | f/f6 | −1.44 |
| (CT3 + CT4 + CT5)/f | 0.27 | Yc62/f | 0.32 |
| (R1 − R2)/(R1 + R2) | 0.12 | ImgH/f | 0.79 |
| (R3 + R4)/(R3 − R4) | −0.98 | BL/ImgH | 0.40 |
| (R9 + R10)/(R9 − R10) | 0.27 | TTL/ImgH | 1.52 |

7th Embodiment

Figure 13:
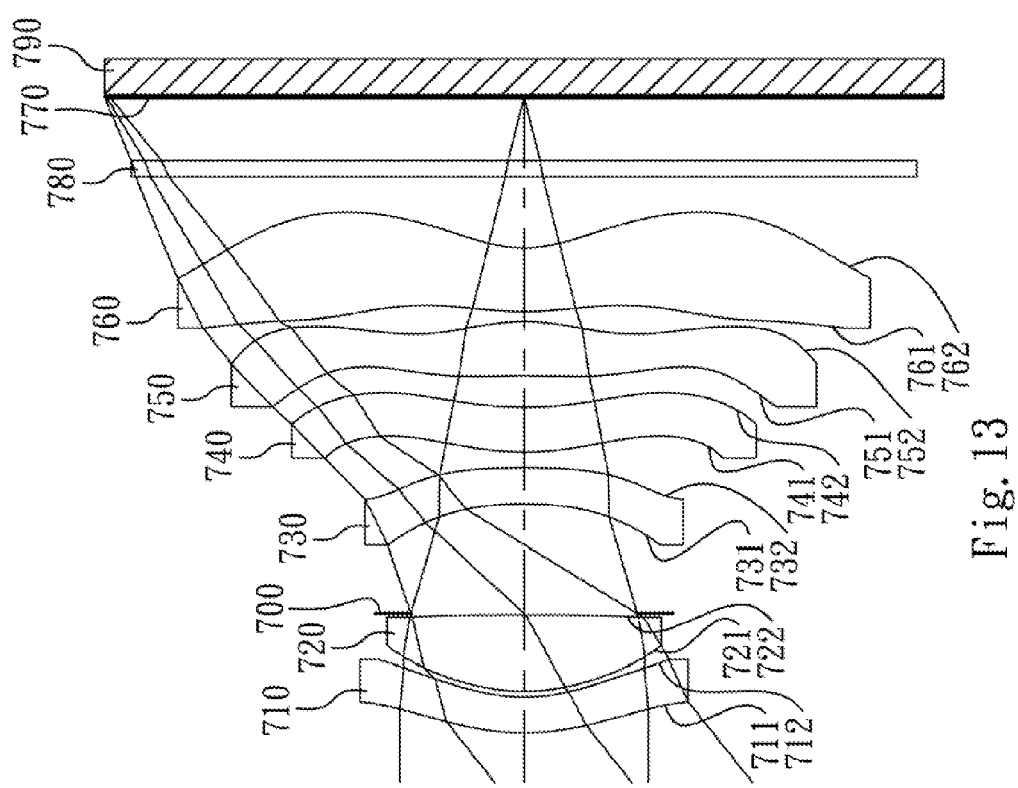
FIG. 13 is a schematic view of an imaging lens assembly according to the 7th embodiment of the present disclosure.
Figure 14:
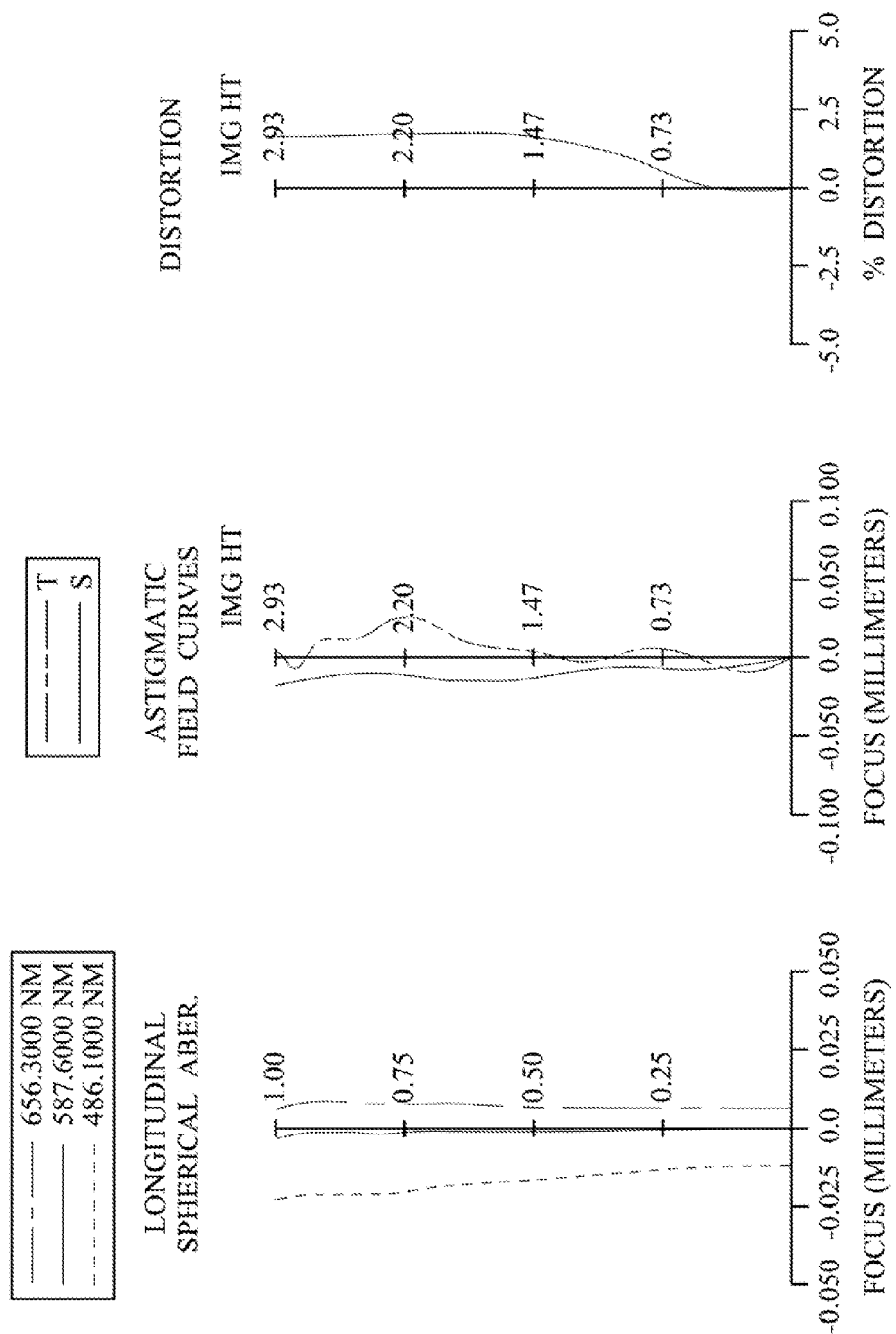
FIG. 14 shows spherical aberration curves, astigmatic field curves and a distortion curve of the imaging lens assembly according to the 7th embodiment.

FIG. 13 is a schematic view of an imaging lens assembly according to the 7th embodiment of the present disclosure. FIG. 14 shows spherical aberration curves, astigmatic field curves and a distortion curve of the imaging lens assembly according to the 7th embodiment. In FIG. 13, the imaging lens assembly includes, in order from an object side to an image side, a first lens element 710, a second lens element 720, an aperture stop 700, a third lens element 730, a fourth lens element 740, a fifth lens element 750, a sixth lens element 760, an IR-cut filter 780, an image plane 770 and an image sensor 790.

The first lens element 710 with negative refractive power has a convex object-side surface 711 and a concave image-side surface 712. The first lens element 710 is made of plastic material and has the object-side surface 711 and the image-side surface 712 being aspheric.

The second lens element 720 with positive refractive power has a convex object-side surface 721 and a convex image-side surface 722. The second lens element 720 is made of plastic material and has the object-side surface 721 and the image-side surface 722 being aspheric. An axial distance between the second lens element 720 and the third lens element 730 is T23, and T23 is the largest among all the axial distances of the lens elements with refractive power.

The third lens element 730 with negative refractive power has a concave object-side surface 731 and a convex image-side surface 732. The third lens element 730 is made of plastic material and has the object-side surface 731 and the image-side surface 732 being aspheric.

The fourth lens element 740 with positive refractive power has a convex object-side surface 741 and a concave image-side surface 742, wherein the object-side surface 741 changes from convex at a paraxial region to concave at a peripheral region, and the image-side surface 742 changes from concave at a paraxial region to convex at a peripheral region, and at least one inflection point formed on the object-side surface 741 and the image-side surface 742 thereof. The fourth lens element 740 is made of plastic material and has the object-side surface 741 and the image-side surface 742 being aspheric.

The fifth lens element 750 with positive refractive power has a concave object-side surface 751 and a convex image-side surface 752, wherein the image-side surface 752 changes from convex to concave, then from concave to convex from a paraxial region to a peripheral region, and at least one inflection point is formed on the object-side surface 751 and the image-side surface 752 thereof. The fifth lens element 750 is made of plastic material and has the object-side surface 751 and the image-side surface 752 being aspheric.

The sixth lens element 760 with negative refractive power has a convex object-side surface 761 and a concave image-side surface 762, wherein at least one inflection point is formed on the object-side surface 761 and the image-side surface 762 thereof. The sixth lens element 760 is made of plastic material and has the object-side surface 761 and the image-side surface 762 being aspheric.

The IR-cut filter 780 made of glass material is located between the sixth lens element 760 and the image plane 770, and will not affect the focal length of the imaging lens assembly.

The detailed optical data of the 7th embodiment are shown in Table 13 and the aspheric surface data are shown in Table 14 below.

TABLE 13

7th Embodiment
f = 3.63 mm, Fno = 2.08, HFOV = 38.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.736 | ASP | 0.250 | Plastic | 1.640 | 23.3 | −9.26 |
| 2 | | 1.267 | ASP | 0.040 | | | | |
| 3 | Lens 2 | 1.389 | ASP | 0.537 | Plastic | 1.544 | 55.9 | 2.48 |
| 4 | | −39.445 | ASP | 0.010 | | | | |
| 5 | Ape. Stop | Plano | | 0.770 | | | | |
| 6 | Lens 3 | −2.252 | ASP | 0.255 | Plastic | 1.640 | 23.3 | −5.74 |
| 7 | | −6.076 | ASP | 0.111 | | | | |
| 8 | Lens 4 | 2.059 | ASP | 0.312 | Plastic | 1.640 | 23.3 | 9.17 |
| 9 | | 2.985 | ASP | 0.224 | | | | |
| 10 | Lens 5 | −6.572 | ASP | 0.380 | Plastic | 1.544 | 55.9 | 3.06 |
| 11 | | −1.356 | ASP | 0.068 | | | | |
| 12 | Lens 6 | 2.378 | ASP | 0.449 | Plastic | 1.544 | 55.9 | −2.53 |
| 13 | | 0.813 | ASP | 0.500 | | | | |
| 14 | IR-cut filter | Plano | | 0.110 | Glass | 1.517 | 64.2 | — |
| 15 | | Plano | | 0.453 | | | | |
| 16 | Image Plane | Plano | | — | | | | |

Reference wavelength (d-line) is 587.6 nm

TABLE 14

Aspheric Coefficients

| | Surface # | | | |
|---|---|---|---|---|
| | 1 | 2 | 3 | 4 |
| k = | −2.4583E+00 | −1.0000E+00 | −2.1102E+00 | −1.0000E+02 |
| A4 = | −5.0676E−02 | −1.7655E−01 | −2.1804E−02 | −2.3117E−02 |
| A6 = | −2.1357E−02 | 1.0766E−03 | 2.8811E−02 | 4.2787E−02 |
| A8 = | 4.1593E−02 | 1.1318E−01 | 7.0336E−04 | −1.0597E−01 |
| A10 = | −9.2223E−02 | −2.3440E−01 | 2.9766E−02 | 1.3272E−01 |
| A12 = | 8.1211E−02 | 2.5916E−01 | −4.8129E−03 | −5.6427E−02 |
| A14 = | −2.3612E−02 | −1.0098E−01 | | |

| | Surface # | | | |
|---|---|---|---|---|
| | 6 | 7 | 8 | 9 |
| k = | 3.6969E+00 | 1.4318E+01 | −1.8822E+00 | −1.9986E+01 |
| A4 = | −3.7784E−02 | −1.2760E−01 | −4.7896E−02 | 1.6464E−01 |
| A6 = | −5.1217E−02 | −1.7491E−01 | −1.7724E−01 | −3.4609E−01 |
| A8 = | −1.6249E−01 | 2.5528E−01 | 1.2932E−01 | 1.8473E−01 |
| A10 = | 6.5155E−01 | −6.5006E−02 | −1.1913E−02 | 4.1060E−03 |
| A12 = | −5.3041E−01 | 1.5098E−02 | −1.7643E−02 | −4.0473E−02 |
| A14 = | 1.5100E−01 | −8.8502E−03 | 4.2603E−03 | 1.4370E−02 |
| A16 = | | | | −1.6034E−03 |

| | Surface # | | | |
|---|---|---|---|---|
| | 10 | 11 | 12 | 13 |
| k = | −2.1565E+01 | −3.8835E+00 | −2.0440E+01 | −5.1068E+00 |
| A4 = | 3.6116E−01 | 4.1121E−01 | −1.7947E−01 | −1.6299E−01 |
| A6 = | −3.5004E−01 | −2.7196E−01 | 5.5812E−02 | 9.4978E−02 |
| A8 = | 1.3329E−01 | 7.9963E−02 | 1.8734E−02 | −4.0506E−02 |
| A10 = | −1.4155E−02 | −8.1629E−03 | −1.4760E−02 | 1.0994E−02 |
| A12 = | −7.4782E−03 | −1.1119E−03 | 3.4360E−03 | −1.8348E−03 |
| A14 = | 2.8094E−03 | 3.0167E−04 | −3.5187E−04 | 1.7442E−04 |
| A16 = | −2.8441E−04 | −1.6895E−05 | 1.3353E−05 | −7.2209E−06 |

In the imaging lens assembly according to the 7th embodiment, the definitions of the following parameters are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 3.63 | \|R12/R11\| | 0.34 |
| Fno | 2.08 | f2/f1 | −0.27 |
| HFOV (deg.) | 38.5 | f12/f2 | 1.47 |
| V3/V2 | 0.42 | f/f6 | −1.44 |
| (CT3 + CT4 + CT5)/f | 0.26 | Yc62/f | 0.34 |
| (R1 − R2)/(R1 + R2) | 0.16 | ImgH/f | 0.81 |
| (R3 + R4)/(R3 − R4) | −0.93 | BL/ImgH | 0.36 |
| (R9 + R10)/(R9 − R10) | 1.52 | TTL/ImgH | 1.51 |

8th Embodiment

Figure 15:
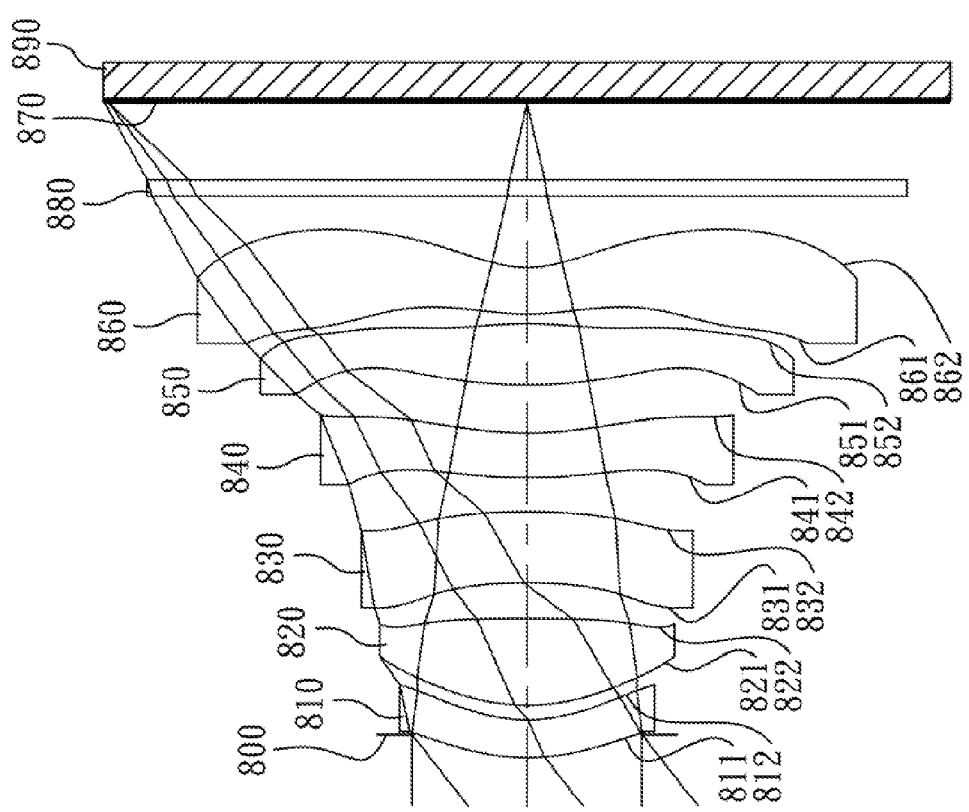
FIG. 15 is a schematic view of an imaging lens assembly according to the 8th embodiment of the present disclosure.
Figure 16:
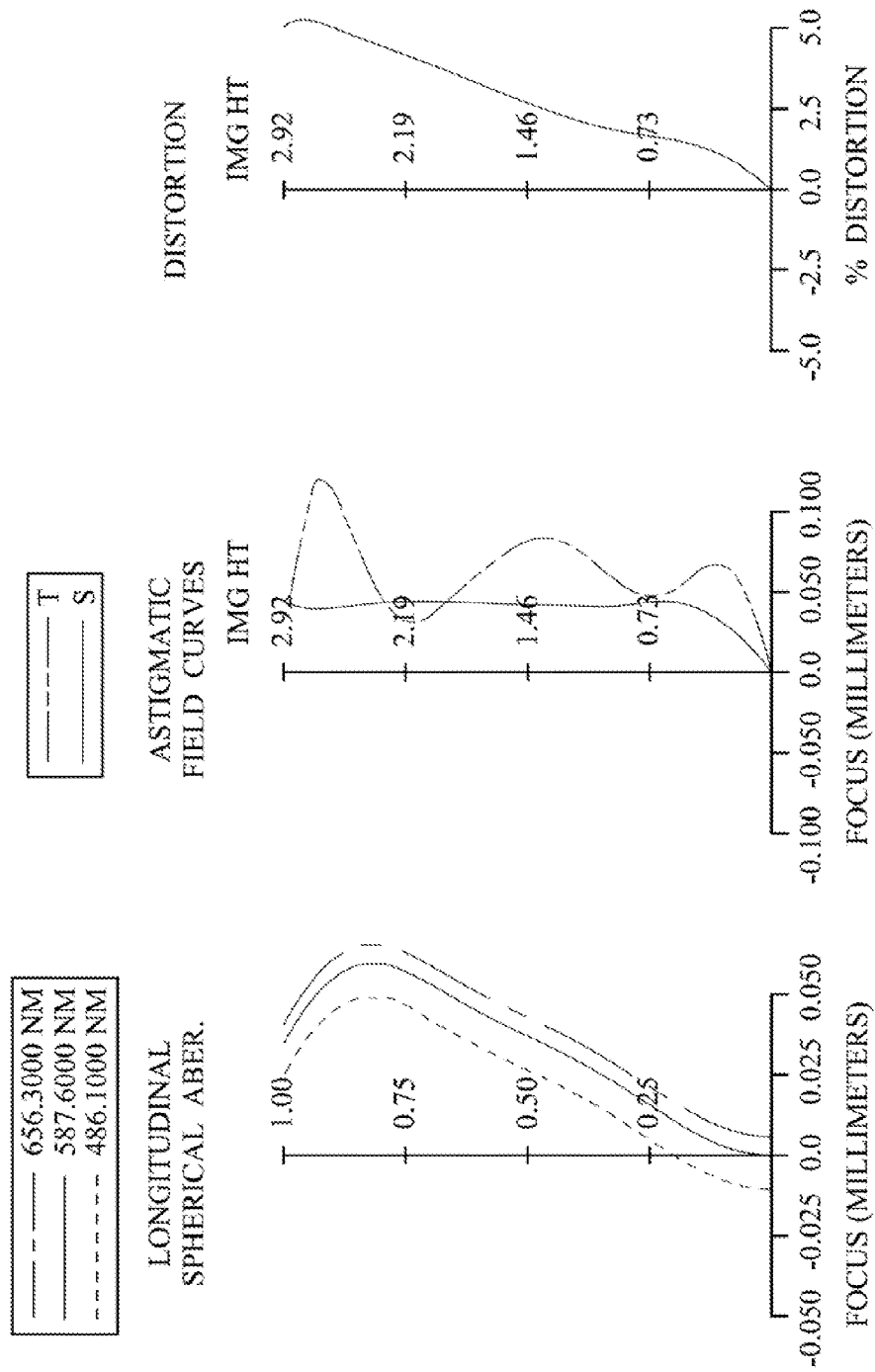
FIG. 16 shows spherical aberration curves, astigmatic field curves and a distortion curve of the imaging lens assembly according to the 8th embodiment.

FIG. 15 is a schematic view of an imaging lens assembly according to the 8th embodiment of the present disclosure. FIG. 16 shows spherical aberration curves, astigmatic field curves and a distortion curve of the imaging lens assembly according to the 8th embodiment. In FIG. 15, the imaging lens assembly includes, in order from an object side to an image side, an aperture stop 800, a first lens element 810, a second lens element 820, a third lens element 830, a fourth lens element 840, a fifth lens element 850, a sixth lens element 860, an IR-cut filter 880, an image plane 870 and an image sensor 890.

The first lens element 810 with negative refractive power has a convex object-side surface 811 and a concave image-side surface 812. The first lens element 810 is made of plastic material and has the object-side surface 811 and the image-side surface 812 being aspheric.

The second lens element 820 with positive refractive power has a convex object-side surface 821 and a convex image-side surface 822. The second lens element 820 is made of plastic material and has the object-side surface 821 and the image-side surface 822 being aspheric.

The third lens element 830 with negative refractive power has a concave object-side surface 831 and a convex image-side surface 832. The third lens element 830 is made of plastic material and has the object-side surface 831 and the image-side surface 832 being aspheric.

The fourth lens element 840 with negative refractive power has a convex object-side surface 841 and a concave image-side surface 842, wherein the object-side surface 841 changes from convex at a paraxial region to concave at a peripheral region, and the image-side surface 842 changes from concave at a paraxial region to convex at a peripheral region, and at least one inflection point is formed on the object-side surface 841 and the image-side surface 842 thereof. The fourth lens element 840 is made of plastic material and has the object-side surface 841 and the image-side surface 842 being aspheric.

The fifth lens element 850 with positive refractive power has a convex object-side surface 851 and a convex image-side surface 852, wherein the image-side surface 852 changes from convex to concave, then from concave to convex from a paraxial region to a peripheral region, and at least one inflection point is formed on the object-side surface 851 and the image-side surface 852 thereof. The fifth lens element 850 is made of plastic material and has the object-side surface 851 and the image-side surface 852 being aspheric.

The sixth lens element 860 with negative refractive power has a convex object-side surface 861 and a concave image-side surface 862, wherein at least one inflection point is formed on the object-side surface 861 and the image-side surface 862 thereof. The sixth lens element 860 is made of plastic material and has the object-side surface 861 and the image-side surface 862 being aspheric.

The IR-cut filter 880 made of glass material is located between the sixth lens element 860 and the image plane 870, and will not affect the focal length of the imaging lens assembly.

The detailed optical data of the 8th embodiment are shown in Table 15 and the aspheric surface data are shown in Table 16 below.

TABLE 15

8th Embodiment
f = 3.52 mm, Fno = 2.20, HFOV = 38.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.160 | | | | |
| 2 | Lens 1 | 1.520 ASP | 0.264 | Plastic | 1.640 | 23.3 | −9.80 |
| 3 | | 1.141 ASP | 0.100 | | | | |
| 4 | Lens 2 | 1.376 ASP | 0.600 | Plastic | 1.544 | 55.9 | 2.45 |
| 5 | | −35.940 ASP | 0.254 | | | | |
| 6 | Lens 3 | −3.762 ASP | 0.489 | Plastic | 1.614 | 25.6 | −26.39 |
| 7 | | −5.142 ASP | 0.241 | | | | |
| 8 | Lens 4 | 3.593 ASP | 0.312 | Plastic | 1.640 | 23.3 | −16.07 |
| 9 | | 2.572 ASP | 0.333 | | | | |
| 10 | Lens 5 | 4.273 ASP | 0.429 | Plastic | 1.544 | 55.9 | 2.87 |
| 11 | | −2.369 ASP | 0.066 | | | | |
| 12 | Lens 6 | 1.560 ASP | 0.320 | Plastic | 1.544 | 55.9 | −2.60 |
| 13 | | 0.688 ASP | 0.500 | | | | |
| 14 | IR-cut filter | Plano | 0.110 | Glass | 1.517 | 64.2 | — |
| 15 | | Plano | 0.554 | | | | |
| 16 | Image Plane | Plano | — | | | | |

Reference wavelength (d-line) is 587.6 nm

TABLE 16

Aspheric Coefficients

| Surface # | 2 | 3 | 4 | 5 |
|---|---|---|---|---|
| k = | −2.0208E+00 | −1.0872E+00 | −1.7840E+00 | 4.0000E+01 |
| A4 = | −4.1732E−02 | −1.4014E−01 | −1.4442E−02 | −1.0671E−01 |
| A6 = | 3.4843E−03 | −5.4703E−03 | 6.3060E−03 | 2.2080E−02 |
| A8 = | −2.0052E−02 | 4.0573E−02 | −8.5343E−02 | −1.7115E−01 |
| A10 = | −5.6708E−02 | −1.7834E−01 | 9.8936E−02 | 3.1839E−01 |
| A12 = | 7.3063E−02 | 1.5849E−01 | 1.5301E−02 | −9.5514E−02 |
| A14 = | −2.9912E−02 | −3.7791E−02 | | |

| Surface # | 6 | 7 | 8 | 9 |
|---|---|---|---|---|
| k = | 4.8405E+00 | −8.3078E+01 | 1.5195E+00 | −2.0000E+01 |
| A4 = | −1.3241E−01 | −8.9805E−02 | −1.9677E−02 | 3.9788E−02 |
| A6 = | −4.6078E−02 | −1.6255E−01 | −1.8012E−01 | −1.2279E−01 |
| A8 = | −8.5639E−02 | 2.6356E−01 | 1.3897E−01 | 7.2815E−02 |
| A10 = | 6.8032E−01 | −6.7830E−02 | −5.9682E−02 | −1.7316E−02 |
| A12 = | −5.7960E−01 | 4.3792E−04 | 1.7676E−02 | 1.7130E−03 |
| A14 = | 1.3973E−01 | −7.5864E−03 | −3.8273E−03 | 2.9682E−05 |

| Surface # | 10 | 11 | 12 | 13 |
|---|---|---|---|---|
| k = | −2.8714E+00 | −3.2684E−01 | −3.5484E+01 | −5.5980E+00 |
| A4 = | 1.5176E−01 | 5.2754E−01 | −1.3821E−01 | −1.6864E−01 |
| A6 = | −2.3248E−01 | −5.7426E−01 | −4.0036E−02 | 9.8268E−02 |
| A8 = | 1.0532E−01 | 3.0812E−01 | 8.5718E−02 | −3.3150E−02 |
| A10 = | −2.3561E−02 | −8.4973E−02 | −3.4402E−02 | 6.0404E−03 |
| A12 = | 2.2319E−03 | 1.1324E−02 | 5.5858E−03 | −5.4185E−04 |
| A14 = | | −5.7339E−04 | −3.2639E−04 | 1.6949E−05 |

In the imaging lens assembly according to the 8th embodiment, the definitions of the following parameters are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f (mm) | 3.52 | |R12/R11| | 0.44 |
| Fno | 2.20 | f2/f1 | −0.25 |
| HFOV (deg.) | 38.0 | f12/f2 | 1.44 |
| V3/V2 | 0.46 | f/f6 | −1.35 |
| (CT3 + CT4 + CT5)/f | 0.35 | Yc62/f | 0.39 |
| (R1 − R2)/(R1 + R2) | 0.14 | ImgH/f | 0.83 |
| (R3 + R4)/(R3 − R4) | −0.93 | BL/ImgH | 0.40 |
| (R9 + R10)/(R9 − R10) | 0.29 | TTL/ImgH | 1.55 |

9th Embodiment

Figure 17:
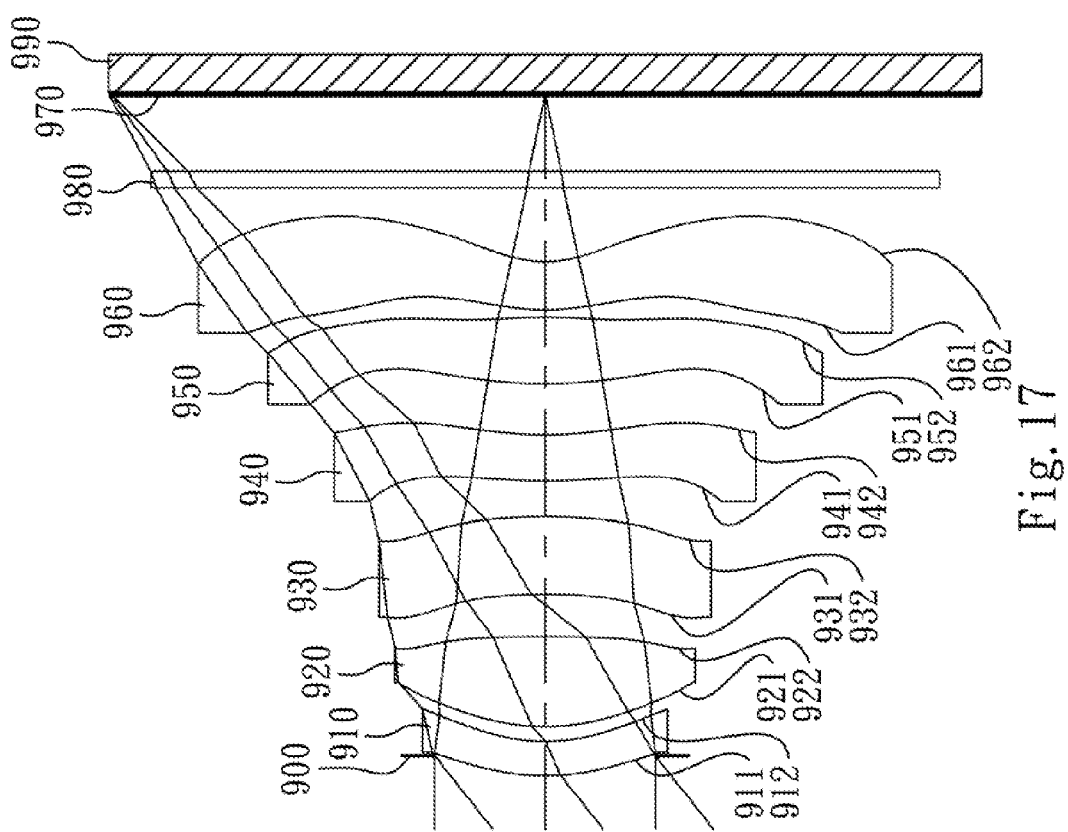
FIG. 17 is a schematic view of an imaging lens assembly according to the 9th embodiment of the present disclosure.
Figure 18:
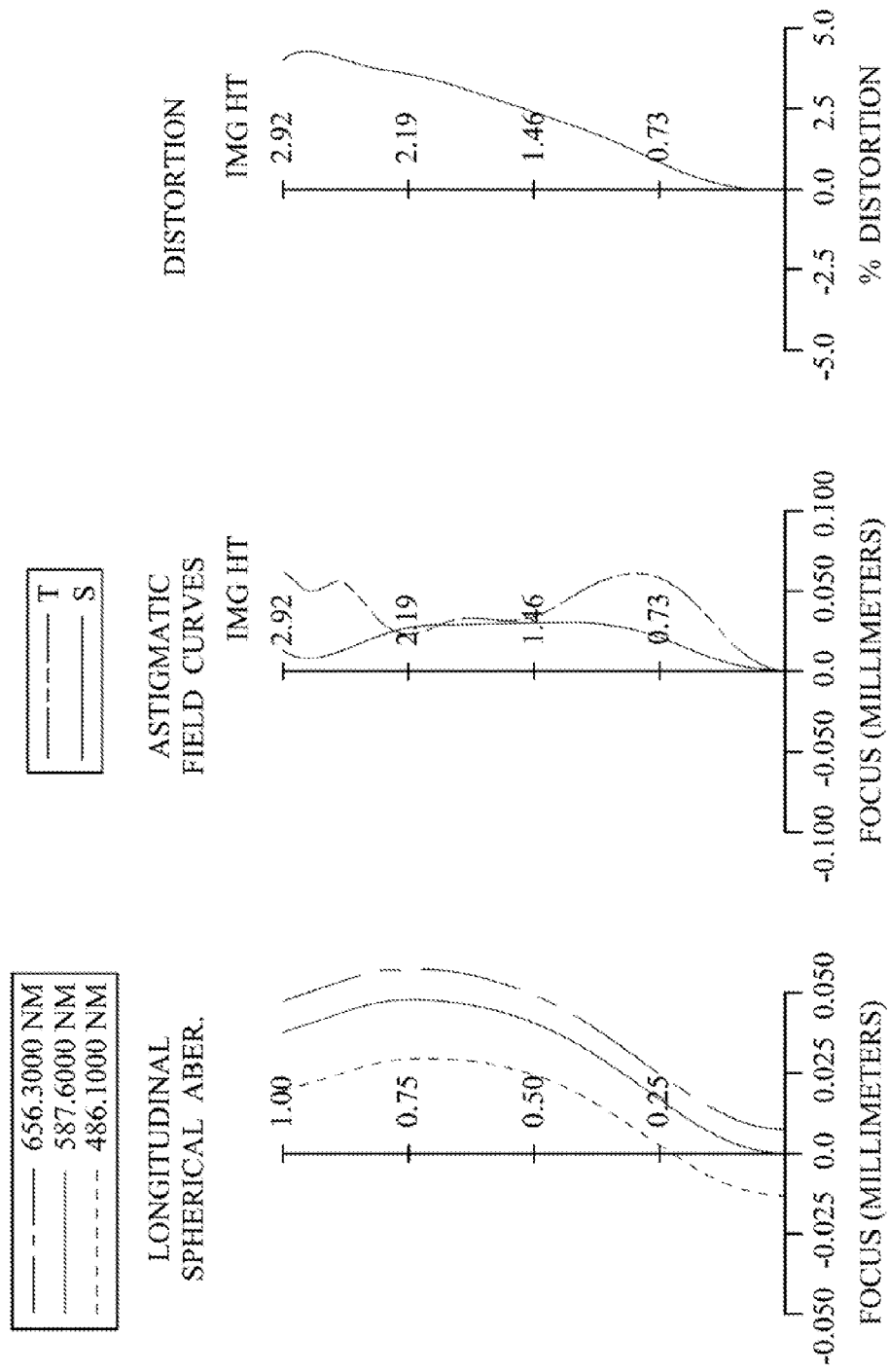
FIG. 18 shows spherical aberration curves, astigmatic field curves and a distortion curve of the imaging lens assembly according to the 9th embodiment.

FIG. 17 is a schematic view of an imaging lens assembly according to the 9th embodiment of the present disclosure. FIG. 18 shows spherical aberration curves, astigmatic field curves and a distortion curve of the imaging lens assembly according to the 9th embodiment. In FIG. 17, the imaging lens assembly includes, in order from an object side to an image side, an aperture stop 900, a first lens element 910, a second lens element 920, a third lens element 930, a fourth lens element 940, a fifth lens element 950, a sixth lens element 960, an IR-cut filter 980, an image plane 970 and an image sensor 990.

The first lens element 910 with negative refractive power has a convex object-side surface 911 and a concave image-side surface 912. The first lens element 910 is made of plastic material and has the object-side surface 911 and the image-side surface 912 being aspheric.

The second lens element 920 with positive refractive power has a convex object-side surface 921 and a convex image-side surface 922. The second lens element 920 is made of plastic material and has the object-side surface 921 and the image-side surface 922 being aspheric.

The third lens element 930 with positive refractive power has a concave object-side surface 931 and a convex image-side surface 932. The third lens element 930 is made of plastic material and has the object-side surface 931 and the image-side surface 932 being aspheric.

The fourth lens element 940 with negative refractive power has a convex object-side surface 941 and a concave image-side surface 942, wherein the object-side surface 941 changes from convex at a paraxial region to concave at a peripheral region, and the image-side surface 942 changes from concave at a paraxial region to convex at a peripheral region, and at least one inflection point is formed on the object-side surface 941 and the image-side surface 942 thereof. The fourth lens element 940 is made of plastic material and has the object-side surface 941 and the image-side surface 942 being aspheric.

The fifth lens element 950 with positive refractive power has a convex object-side surface 951 and a convex image-side surface 952, wherein the image-side surface 952 changes from convex to concave, then from concave to convex from a paraxial region to a peripheral region, and at least one inflection point is formed on the object-side surface 951 and the image-side surface 952 thereof. The fifth lens element 950 is made of plastic material and has the object-side surface 951 and the image-side surface 952 being aspheric.

The sixth lens element 960 with negative refractive power has a convex object-side surface 961 and a concave image-side surface 962, wherein at least one inflection point is formed on the object-side surface 961 and the image-side surface 962 thereof. The sixth lens element 960 is made of plastic material and has the object-side surface 961 and the image-side surface 962 being aspheric.

The IR-cut filter 980 made of glass material is located between the sixth lens element 960 and the image plane 970, and will not affect the focal length of the imaging lens assembly.

The detailed optical data of the 9th embodiment are shown in Table 17 and the aspheric surface data are shown in Table 18 below.

TABLE 17

9th Embodiment
f = 3.56 mm, Fno = 2.40, HFOV = 38.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.134 | | | | |
| 2 | Lens 1 | 1.560 | ASP | 0.230 | Plastic | 1.634 | 23.8 | −10.89 |
| 3 | | 1.200 | ASP | 0.100 | | | | |
| 4 | Lens 2 | 1.465 | ASP | 0.599 | Plastic | 1.544 | 55.9 | 2.55 |
| 5 | | −22.101 | ASP | 0.290 | | | | |
| 6 | Lens 3 | −3.796 | ASP | 0.519 | Plastic | 1.543 | 56.5 | 177.56 |
| 7 | | −3.828 | ASP | 0.240 | | | | |
| 8 | Lens 4 | 4.719 | ASP | 0.313 | Plastic | 1.650 | 21.4 | −9.10 |
| 9 | | 2.556 | ASP | 0.340 | | | | |
| 10 | Lens 5 | 3.803 | ASP | 0.449 | Plastic | 1.544 | 55.9 | 3.30 |
| 11 | | −3.270 | ASP | 0.050 | | | | |
| 12 | Lens 6 | 1.445 | ASP | 0.320 | Plastic | 1.544 | 55.9 | −3.00 |
| 13 | | 0.707 | ASP | 0.500 | | | | |
| 14 | IR-cut filter | Plano | | 0.110 | Glass | 1.517 | 64.2 | — |
| 15 | | Plano | | 0.519 | | | | |
| 16 | Image Plane | Plano | | — | | | | |

Reference wavelength (d-line) is 587.6 nm

TABLE 18

Aspheric Coefficients

| | Surface # | | | |
|---|---|---|---|---|
| | 2 | 3 | 4 | 5 |
| k = | −2.2614E+00 | −1.0972E+00 | −1.8835E+00 | 4.0000E+01 |
| A4 = | −4.1748E−02 | −1.3830E−01 | −3.1404E−02 | −1.1070E−01 |
| A6 = | 3.5481E−03 | 1.7120E−02 | 2.8344E−02 | 2.0014E−02 |
| A8 = | −2.0047E−02 | 4.0577E−02 | −8.5333E−02 | −1.6721E−01 |
| A10 = | −5.6703E−02 | −1.6886E−01 | 9.6217E−02 | 3.1016E−01 |
| A12 = | 7.0440E−02 | 1.5849E−01 | −1.5296E−02 | −1.0243E−01 |
| A14 = | −2.9895E−02 | −3.7779E−02 | | |

| | Surface # | | | |
|---|---|---|---|---|
| | 6 | 7 | 8 | 9 |
| k = | 3.9239E+00 | −8.5628E+01 | −5.3575E+00 | −2.0000E+01 |
| A4 = | −1.2993E−01 | −1.2997E−01 | −1.3104E−02 | 9.2254E−03 |
| A6 = | −4.6181E−02 | −1.4666E−01 | −2.1791E−01 | −1.2072E−01 |
| A8 = | −8.5426E−02 | 2.6300E−01 | 1.4591E−01 | 7.4135E−02 |
| A10 = | 6.8963E−01 | −6.8447E−02 | −4.8719E−02 | −1.7989E−02 |
| A12 = | −5.8700E−01 | −2.2715E−03 | 1.9492E−02 | 1.6787E−03 |
| A14 = | 1.4157E−01 | −2.4207E−03 | −1.0195E−02 | 5.6513E−05 |

| | Surface # | | | |
|---|---|---|---|---|
| | 10 | 11 | 12 | 13 |
| k = | −3.1529E+01 | −7.0211E−02 | −1.1709E+01 | −4.2553E+00 |
| A4 = | 1.5180E−01 | 4.6027E−01 | −1.3310E−01 | −1.7829E−01 |
| A6 = | −2.3249E−01 | −5.4271E−01 | −5.2904E−02 | 9.7661E−02 |
| A8 = | 1.0531E−01 | 3.0182E−01 | 8.7809E−02 | −3.1896E−02 |
| A10 = | −2.3569E−02 | −8.5269E−02 | −3.4075E−02 | 5.7743E−03 |
| A12 = | 2.2296E−03 | 1.1326E−02 | 5.5371E−03 | −5.2194E−04 |
| A14 = | | −5.2240E−04 | −3.2947E−04 | 1.6949E−05 |

In the imaging lens assembly according to the 9th embodiment, the definitions of the following parameters are the same as those stated in the 1st embodiment with corresponding values for the 9th embodiment. Moreover, these parameters can be calculated from Table 17 and Table 18 as the following values and satisfy the following relationships:

| | | | |
|---|---|---|---|
| f (mm) | 3.56 | \|R12/R11\| | 0.49 |
| Fno | 2.40 | f2/f1 | −0.23 |
| HFOV (deg.) | 38.0 | f12/f2 | 1.39 |
| V3/V2 | 1.01 | f/f6 | −1.18 |
| (CT3 + CT4 + CT5)/f | 0.36 | Yc62/f | 0.39 |
| (R1 − R2)/(R1 + R2) | 0.13 | ImgH/f | 0.82 |
| (R3 + R4)/(R3 − R4) | −0.88 | BL/ImgH | 0.39 |
| (R9 + R10)/(R9 − R10) | 0.08 | TTL/ImgH | 1.56 |

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An imaging lens assembly comprising, in order from an object side to an image side:
    a first lens element with negative refractive power having a convex object-side surface and a concave image-side surface;
    a second lens element with positive refractive power;
    a third lens element with refractive power;
    a fourth lens element with refractive power, wherein an object-side surface and an image-side surface of the fourth lens element are aspheric;
    a fifth lens element with positive refractive power, wherein an object-side surface and an image-side surface of the fifth lens element are aspheric; and
    a sixth lens element with negative refractive power having a concave image-side surface, wherein the sixth lens element has at least one inflection point on the image-side surface thereof;
    wherein a curvature radius of an object-side surface of the sixth lens element is R11, a curvature radius of the image-side surface of the sixth lens element is R12, a focal length of the imaging lens assembly is f, a focal length of the sixth lens element is f6, and the following relationships are satisfied:

$0 < |R12/R11| < 1.0$; and $-2.5 < f/f6 < -0.60$.

2. The imaging lens assembly of claim 1, wherein the second lens element has a convex object-side surface.

3. The imaging lens assembly of claim 2, wherein a composite focal length of the first lens element and the second lens element is f12, a focal length of the second lens element is f2, and the following relationship is satisfied:

$0.9 < f12/f2 < 1.8$.

4. The imaging lens assembly of claim 3, wherein the object-side surface of the sixth lens element is convex, an f-number of the imaging lens assembly is Fno, and the following relationship is satisfied:

$1.5 < Fno < 2.5$.

5. The imaging lens assembly of claim 3, wherein the curvature radius of the object-side surface of the sixth lens element is R1, the curvature radius of the image-side surface of the sixth lens element is R12, and the following relationship is satisfied:

$0 < |R12/R11| < 0.60$.

6. The imaging lens assembly of claim 3, wherein a maximum image height of the imaging lens assembly is ImgH, the focal length of the imaging lens assembly is f, and the following relationship is satisfied:

$0.70 < \text{ImgH}/f < 1.10$.

7. The imaging lens assembly of claim 3, wherein the maximum image height of the imaging lens assembly is ImgH, an axial distance between the image-side surface of the sixth lens element and an image plane is BL, and the following relationship is satisfied:

$0.15 < BL/\text{ImgH} < 0.50$.

8. The imaging lens assembly of claim 3, wherein a curvature radius of the object-side surface of fifth lens element is R9, a curvature of the image-side surface of the fifth lens element is R10, and the following relationship is satisfied:

$-0.5 < (R9+R10)/(R9-R10) < 2.5$.

9. The imaging lens assembly of claim 8, wherein the image-side surface of the fourth lens element changes from concave at a paraxial region thereof to convex at a peripheral region thereof.

10. The imaging lens assembly of claim 1, wherein the focal length of the imaging lens assembly is f, the focal length of the sixth lens element is f6, and the following relationship is satisfied:

$-2.0 < f/f6 < -0.80$.

11. The imaging lens assembly of claim 10, wherein an Abbe number of the second lens element is V2, an Abbe number of the third lens element is V3, and the following relationship is satisfied:

$0.2 < V3/V2 < 0.5$.

12. The imaging lens assembly of claim 10, wherein a curvature radius of an object-side surface of the second lens element is R3, a curvature radius of an image-side surface of the second lens element is R4, and the following relationship is satisfied:

$-1.2 < (R3+R4)/(R3-R4) < -0.45$.

13. The imaging lens assembly of claim 10, wherein the third lens element has a concave object-side surface and a convex image-side surface.

14. The imaging lens assembly of claim 10, wherein a minimum distance between an optical axis and a non-axial critical point on the image-side surface of the sixth lens element is Yc62, the focal length of the imaging lens assembly is f, and the following relationship is satisfied:

$0.1 < Yc62/f < 0.8$.

15. The imaging lens assembly of claim 1, wherein the object-side surface of the fourth lens element is convex and the image-side surface of the fourth lens element is concave.

16. The imaging lens assembly of claim 15, wherein the object-side surface of the fourth lens element changes from convex at a paraxial region thereof to concave at a peripheral region thereof, the image-side surface of the fourth lens element changes from concave at a paraxial region thereof to convex at a peripheral region thereof.

17. The imaging lens assembly of claim 15, wherein a focal length of the first lens element is f1, a focal length of the second lens element is f2, and the following relationship is satisfied:

$$-0.5<f2/f1<0.$$

18. The imaging lens assembly of claim 15, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, wherein T23 is the largest among T12, T23, T34, T45, and T56.

19. The imaging lens assembly of claim 1, wherein the image-side surface of the fifth lens element changes from convex to concave, then from concave to convex from a paraxial region to a peripheral region thereof.

20. The imaging lens assembly of claim 1, wherein an axial distance between the object-side surface of the first lens element and an image plane is TTL, a maximum image height of the imaging lens assembly is ImgH, and the following relationship is satisfied:

$$TTL/\mathrm{Img}H<1.7.$$

21. The imaging lens assembly of claim 20, wherein a central thickness of the third lens element is CT3, a central thickness of the fourth lens element is CT4, a central thickness of the fifth lens element is CT5, the focal length of the imaging lens assembly is f, and the following relationship is satisfied:

$$0.20<(CT3+CT4+CT5)/f<0.40.$$

22. The imaging lens assembly of claim 20, wherein the fourth lens element and the fifth lens element have at least one inflection point on the object-side surfaces and the image-side surfaces thereof respectively, a curvature radius of the object-side surface of the first lens element is R1, a curvature radius of the image-side surface of the first lens element is R2, and the following relationship is satisfied:

$$0.03<(R1-R2)/(R1+R2)<0.3.$$

* * * * *

UNITED STATES PATENT AND TRADEMARK OFFICE
CERTIFICATE OF CORRECTION

| | | |
|---|---|---|
| PATENT NO. | : 8,743,483 B2 | Page 1 of 1 |
| APPLICATION NO. | : 13/733876 | |
| DATED | : June 3, 2014 | |
| INVENTOR(S) | : Po-Lun Hsu, Tsung-Han Tsai and Hsin-Hsuan Huang | |

It is certified that error appears in the above-identified patent and that said Letters Patent is hereby corrected as shown below:

In the Claims:

(1) In column 36, line 1, claim 5 of the issued patent, US 8,743,483, shows a symbol which represents the curvature radius of the object-side surface of the sixth lens element. However, the symbol in claim 5 should be corrected to "R11" instead of "R1" appearing in the issued patent.

Signed and Sealed this
Second Day of September, 2014

Michelle K. Lee
*Deputy Director of the United States Patent and Trademark Office*